US009570751B2

(12) United States Patent
Cha et al.

(10) Patent No.: US 9,570,751 B2
(45) Date of Patent: *Feb. 14, 2017

(54) BINDER COMPOSITION FOR SECONDARY BATTERY, ANODE INCLUDING THE BINDER COMPOSITION, AND LITHIUM BATTERY INCLUDING THE ANODE

(71) Applicant: Samsung SDI Co., Ltd., Yongin-si, Gyeonggi-do (KR)

(72) Inventors: Jun-Kyu Cha, Yongin-si (KR); Dong-Ho Son, Yongin-si (KR); Ki-Jun Kim, Yongin-si (KR); Bok-Hyun Ka, Yongin-si (KR); Gil-Won Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 166 days.

This patent is subject to a terminal disclaimer.

(21) Appl. No.: 14/189,755

(22) Filed: Feb. 25, 2014

(65) Prior Publication Data

US 2014/0239239 A1    Aug. 28, 2014

(30) Foreign Application Priority Data

Feb. 26, 2013 (KR) .................. 10-2013-0020684
Mar. 13, 2013 (KR) .................. 10-2013-0026813
Mar. 13, 2013 (KR) .................. 10-2013-0026816
Mar. 13, 2013 (KR) .................. 10-2013-0026817
Mar. 13, 2013 (KR) .................. 10-2013-0026818

(51) Int. Cl.
*H01M 4/62* (2006.01)
*H01M 4/134* (2010.01)
*H01M 10/052* (2010.01)

(52) U.S. Cl.
CPC ............ *H01M 4/622* (2013.01); *H01M 4/134* (2013.01); *H01M 4/621* (2013.01); *H01M 10/052* (2013.01); *Y02E 60/122* (2013.01); *Y02T 10/7011* (2013.01)

(58) Field of Classification Search
CPC .................................................. H01M 4/622
IPC .................................................... H01M 4/622
See application file for complete search history.

(56) References Cited

U.S. PATENT DOCUMENTS

| | | | | |
|---|---|---|---|---|
| 5,248,573 A * | 9/1993 | Arkens | ........... | C08F 265/04 429/250 |
| 6,352,762 B1 * | 3/2002 | Shimizu | ........... | C08J 7/047 428/323 |
| 6,710,112 B1 * | 3/2004 | Sandor | ........... | C08F 2/22 524/457 |
| 6,787,596 B1 * | 9/2004 | Maier | ........... | C08F 283/006 524/507 |
| 7,217,758 B2 * | 5/2007 | Buckmann | ........... | C09D 201/00 524/501 |
| 7,534,830 B2 * | 5/2009 | Williams | ........... | C08G 18/0823 524/507 |
| 7,947,199 B2 * | 5/2011 | Wessling | ........... | B82Y 30/00 252/500 |
| 8,268,390 B2 * | 9/2012 | Urban | ........... | C09J 7/00 427/208.4 |
| 2002/0147250 A1 * | 10/2002 | Beach | ........... | C09D 11/322 523/160 |
| 2003/0077443 A1 * | 4/2003 | Di Stefano | ........... | C09J 7/00 428/355 AC |
| 2003/0113626 A1 | 6/2003 | Maeda et al. | | |
| 2003/0143409 A1 * | 7/2003 | Di Stefano | ........... | C09J 7/00 428/447 |
| 2004/0233526 A1 * | 11/2004 | Kaminsky | ........... | G02B 1/045 359/452 |
| 2005/0158624 A1 * | 7/2005 | Park | ........... | H01M 4/133 429/217 |
| 2006/0167137 A1 * | 7/2006 | Hallden-Abberton | ........... | C08F 220/18 523/160 |
| 2007/0066711 A1 * | 3/2007 | Fasano | ........... | C09D 11/30 523/160 |
| 2007/0225401 A1 * | 9/2007 | Sarkisian | ........... | C09D 11/54 523/160 |
| 2007/0236835 A1 * | 10/2007 | Oyanagi | ........... | G11B 5/70 360/131 |
| 2008/0124631 A1 * | 5/2008 | Fukui | ........... | H01M 4/0404 429/217 |
| 2009/0023065 A1 * | 1/2009 | Hwang | ........... | H01M 4/1393 429/220 |

(Continued)

FOREIGN PATENT DOCUMENTS

JP        8-321326 A      12/1996
JP        11-025989 A     1/1999

(Continued)

OTHER PUBLICATIONS

Korean Office Action dated Aug. 31, 2016 for Korean Patent Application No. KR 10-2013-0020684 from which subject U.S. Appl. No. 14/189,755 claims priority.
Korean Office Action dated Aug. 31, 2016 for Korean Patent Application No. KR 10-2013-0026813 from which subject U.S. Appl. No. 14/189,755 claims priority.
Korean Office Action dated Aug. 31, 2016 for Korean Patent Application No. KR 10-2013-0026816, from which subject U.S. Appl. No. 14/189,755 claims priority.

(Continued)

*Primary Examiner* — Liam J Heincer
(74) *Attorney, Agent, or Firm* — Knobbe Martens Olson & Bear LLP

(57) ABSTRACT

A binder composition for a secondary battery, and an anode and a lithium battery that include the binder composition are disclosed. The binder composition may include: first nanoparticles having a glass transition temperature of about 60° C. or greater and an average particle diameter of about 100 nm or less; and a first polymer binder having a glass transition temperature of about 20° C. or less.

31 Claims, 2 Drawing Sheets

(56) References Cited

U.S. PATENT DOCUMENTS

| | | | | |
|---|---|---|---|---|
| 2009/0155474 A1* | 6/2009 | Finley | C09D 133/04 | 427/389.8 |
| 2009/0233237 A1* | 9/2009 | Yoshiki | H05K 3/106 | 430/311 |
| 2009/0294057 A1* | 12/2009 | Liang | C09J 151/04 | 156/330 |
| 2010/0010112 A1* | 1/2010 | Prenzel | C09J 133/08 | 522/86 |
| 2010/0055370 A1* | 3/2010 | Diehl | C09J 133/02 | 428/40.6 |
| 2010/0096597 A1* | 4/2010 | Prud'Homme | B82Y 30/00 | 252/511 |
| 2010/0209774 A1* | 8/2010 | Minami | H01M 4/366 | 429/218.1 |
| 2010/0309260 A1* | 12/2010 | Hakiri | C09D 11/324 | 347/56 |
| 2011/0033743 A1* | 2/2011 | Lee | H01M 2/1653 | 429/145 |
| 2011/0036497 A1* | 2/2011 | Lammerschop | C09J 11/08 | 156/330 |
| 2011/0048637 A1* | 3/2011 | Kohli | C09J 163/00 | 156/307.1 |
| 2011/0091774 A1* | 4/2011 | Wakizaka | C08J 5/18 | 429/246 |
| 2011/0129731 A1* | 6/2011 | Wakizaka | H01M 4/0435 | 429/217 |
| 2011/0234689 A1* | 9/2011 | Saito | C08F 220/30 | 347/21 |
| 2011/0319534 A1* | 12/2011 | Ding | C08L 67/02 | 524/100 |
| 2012/0009517 A1* | 1/2012 | Ganapathiappan | G03G 15/10 | 430/117.1 |
| 2012/0064415 A1* | 3/2012 | Satow | H01M 4/133 | 429/338 |
| 2012/0092411 A1* | 4/2012 | Hakiri | B41J 2/2107 | 347/20 |
| 2012/0107690 A1* | 5/2012 | Wakizaka | H01M 4/13 | 429/217 |
| 2012/0189911 A1* | 7/2012 | Kang | H01M 10/052 | 429/211 |
| 2012/0189915 A1* | 7/2012 | Cho | H01M 4/136 | 429/215 |
| 2012/0309892 A1* | 12/2012 | Ootsuka | H01M 4/13 | 524/546 |
| 2012/0315541 A1* | 12/2012 | Sasaki | H01M 4/131 | 429/211 |
| 2013/0122533 A1* | 5/2013 | Pitchai-Mydeen | C08J 5/18 | 435/28 |
| 2013/0130102 A1* | 5/2013 | Sakamoto | C07D 307/12 | 429/200 |
| 2013/0143010 A1* | 6/2013 | Buchner | C08G 18/0828 | 428/200 |
| 2013/0171521 A1* | 7/2013 | Sugimoto | H01M 4/0404 | 429/211 |
| 2013/0209875 A1* | 8/2013 | Maegawa | C08K 5/01 | 429/211 |
| 2013/0209882 A1* | 8/2013 | Kim | C08K 5/5406 | 429/217 |
| 2013/0273421 A1* | 10/2013 | Matsumura | H01M 4/13 | 429/211 |
| 2013/0316235 A1* | 11/2013 | Yasuda | H01M 4/02 | 429/211 |
| 2014/0011094 A1* | 1/2014 | Park | H01M 4/386 | 429/307 |
| 2014/0065435 A1* | 3/2014 | Overbeek | C08F 265/06 | 428/461 |
| 2014/0079995 A1* | 3/2014 | Wakada | H01M 4/366 | 429/211 |
| 2014/0087272 A1* | 3/2014 | Takeuchi | H01M 4/8605 | 429/405 |
| 2014/0178756 A1* | 6/2014 | Ishii | H01M 4/622 | 429/211 |
| 2014/0231706 A1* | 8/2014 | Cha | C09J 11/08 | 252/182.1 |
| 2014/0231719 A1* | 8/2014 | Cha | H01M 4/622 | 252/503 |
| 2014/0272574 A1* | 9/2014 | Son | H01M 4/622 | 429/217 |
| 2014/0288202 A1* | 9/2014 | Dombrowski | C04B 28/02 | 521/137 |
| 2015/0050555 A1* | 2/2015 | Fukumine | H01M 10/0525 | 429/217 |
| 2015/0125755 A1* | 5/2015 | Ishii | H01G 11/38 | 429/233 |
| 2015/0132644 A1* | 5/2015 | Sonobe | H01M 4/133 | 429/217 |
| 2015/0187516 A1* | 7/2015 | Miyauchi | H01M 4/134 | 361/502 |
| 2015/0340697 A1* | 11/2015 | Jang | H01M 4/622 | 429/341 |

FOREIGN PATENT DOCUMENTS

| | | |
|---|---|---|
| JP | 2002-256129 A | 9/2002 |
| JP | 2005-222780 A | 8/2005 |
| JP | 3721727 B2 | 9/2005 |
| JP | 2006-172992 A | 6/2006 |
| JP | 4473967 B2 | 3/2010 |
| JP | 2011-049046 A | 3/2011 |
| JP | 2011-134649 A | 7/2011 |
| KR | 10-2004-0078927 A | 9/2004 |
| KR | 10-2009-0055305 A | 6/2009 |
| KR | 10-2011-0038115 A | 4/2011 |

OTHER PUBLICATIONS

Korean Office Action dated Aug. 31, 2016 for Korean Patent Application No. KR 10-2013-0026817 from which subject U.S. Appl. No. 14/189,755 claims priority.

Korean Office Action dated Aug. 31, 2016 for Korean Patent Application No. KR 10-2013-0026818 from which subject U.S. Appl. No. 14/189,755 claims priority.

* cited by examiner

BINDER COMPOSITION FOR SECONDARY BATTERY, ANODE INCLUDING THE BINDER COMPOSITION, AND LITHIUM BATTERY INCLUDING THE ANODE

CROSS-REFERENCE TO RELATED APPLICATIONS

Any and all priority claims identified in the Application Data Sheet, or any correction thereto, are hereby incorporated by reference under 37 CFR 1.57. For example, this application claims the benefit of Korean Patent Application No. 10-2013-0020684, filed on Feb. 26, 2013 and Korean Patent Application Nos. 10-2013-0026813, 10-2013-0026816, 10-2013-0026817, and 10-2013-0026818, filed on Mar. 13, 2013, in the Korean Intellectual Property Office, the disclosures of which are incorporated herein by reference in their entirety.

BACKGROUND

Field

The present disclosure relates to a binder composition, an anode including the binder composition, and a lithium battery including the anode.

Description of the Related Technology

Lithium batteries are widely used in various applications due to their high voltage and high energy density. Devices such as electric vehicles (HEV, PHEV), and the like require operation at high temperatures, being able to charge or discharge a large amount of electricity, and having long-term usability. Thus, the lithium batteries used in electric vehicles are required to have high-discharge capacity and better lifetime characteristics.

Carbonaceous materials are porous and can remain stable with little volumetric change during the charging and discharging process. However, carbonaceous materials may lead to a low-battery capacity due to the porous structure of carbon. For example, graphite, which is an ultra-high crystalline material, has a theoretical capacity density of about 372 mAh/g in the form of $LiC_6$, In addition, metals that are alloyable with lithium may be used as an anode active material for achieving a higher electrical capacity, as compared to carbonaceous materials. Examples of metals that are alloyable with lithium include silicon (Si), tin (Sn), aluminum (Al), and the like. These metals alloyable with lithium tend to easily deteriorate and have relatively poor lifetime characteristics. For example, during the repeated charging and discharging operations, the Sn particles used in battery may undergo repeated aggregation and breakage and resulting in electric disconnections.

Polyimides and polyamideimides that are commonly used in the art have been tested as binders in lithium batteries to suppress expansion of electrodes. However, these binders may not be practically applicable in lithium polymer batteries that are manufactured using the winding and pressing processes to harden the electrodes, because the binders may cause cracks in the electrodes during the manufacture process.

There is an increasing use of a diene-based copolymer as a binder in an anode. The diene-binder copolymer binder has good flexibility but may have a weak strength when impregnated with an electrolyte. Accordingly, the diene-binder copolymer may not suppress the expansion of the electrode when a non-carbonaceous, high-capacity anode active material, such as a Si or Sn metal alloyable with lithium, is used.

The diene-based copolymer binder may be prepared by emulsion polymerization, suspension polymerization, or the like. For example, a method of preparing a diene-based copolymer binder via emulsion polymerization to have a two-phase (core/shell) particle structure, or a method of continuously changing the composition of the diene-based copolymer binder via power feed polymerization have been introduced. However, such a polymer binder with core/shell particles or prepared by the continuous changing of the polymer composition may not maintain a good balance between the battery flexibility and the battery strength when impregnated with electrolyte.

For example, a glass transition temperature (Tg) of the shell regions of the core/shell structured binder particles may be increased to obtain binder particles with hard surfaces. However, the binder particles with hard surfaces may have poor film formability and may reduce the strength of the electrode. On the other hand, the Tg of the shell regions of the core/shell structured binder particles may be decreased to obtain the binder particles with soft surfaces. However, the binder particles with soft surfaces may have weak strength when combined with electrolyte. A polymer binder obtained with continuous changing of the polymer composition via power feed polymerization may not maintain a balance between flexibility and strength when combined with electrolyte.

Therefore, there is a need for a binder that may overcome the drawbacks of the conventional technologies and that may absorb and/or suppress a volumetric change of a non-carbonaceous anode active material.

SUMMARY OF CERTAIN INVENTIVE ASPECTS

One or more embodiments of the present invention include a binder composition for a secondary battery, the binder composition having improved strength.

One or more embodiments include an anode including the binder composition.

One or more embodiments include a lithium battery including the anode.

Additional aspects will be set forth in part in the description which follows and, in part, will be apparent from the description, or may be learned by practice of the presented embodiments.

In some embodiments, a binder composition for a secondary battery includes: first nanoparticles having a glass transition temperature of about 60° C. or greater and an average particle diameter of about 100 nm or less; and a first polymer binder having a glass transition temperature of about 20° C. or less.

In some embodiments, an anode includes: an anode active material; and the above-described binder composition for a secondary battery.

In some embodiments, a lithium battery includes the above-described anode.

One aspect of the present disclosure relates to a binder composition for a secondary battery, comprising:
a plurality of first nanoparticles having a glass transition temperature of about 60° C. or greater and an average particle diameter of about 100 nm or less; and
a first polymer binder having a glass transition temperature of about 20° C. or less.

In some embodiments, the amount of the first nanoparticles is in the range of about 1 part to about 60 parts by weight based on 100 parts by weight of the first polymer binder.

In some embodiments, the first nanoparticles are dispersed in the first polymer binder.

In some embodiments, the first nanoparticles are randomly dispersed in the first polymer binder.

In some embodiments, the binder composition comprises a first polymer binder aggregate of at least two first polymer binders, and the first nanoparticles are disposed in an interface between the at least two first polymer binders.

In some embodiments, the first nanoparticles are randomly disposed in the interface between the at least two first polymer binders.

In some embodiments, the first nanoparticles comprises at least one selected from the group consisting of polyethylene, polypropylene, an ethylene-propylene copolymer, polyvinylchloride, polyvinylidenechloride, polystyrene, polyacrylonitrile, polytetrafluoroethylene, polymethylmethacrylate, polyvinylacetate, polyisoprene, polychloroprene, polyester, polycarbonate, polyamide, polyacrylate, polyurethane, an acrylonitrile-butadiene-styrene copolymer, polyoxyethylene, polyoxymethylene, polyoxypropylene, a styrene-acrylonitrile copolymer, an acrylonitrile-styrene-acrylate copolymer, a styrene-butadiene copolymer, an acrylated styrene-butadiene copolymer, an acrylonitrile-butadiene copolymer, an acrylonitrile-butadiene-styrene copolymer, acryl rubber, butyl rubber, fluorine rubber, polyvinylpyrolidone, polyepichlorohydrin, polyphosphazene, an ethylene propylene diene copolymer, polyvinylpyridine, chlorosulfonated polyethylene, polysulfone, polyvinylalcohol, thermoplastic polyester rubber (PTEE), carboxymethyl cellulose, hydroxypropylmethyl cellulose, hydroxypropyl cellulose, diacetyl cellulose, and any combinations thereof.

In some embodiments, the first polymer binder comprises at least one selected from the group consisting of styrene-butadiene rubber, acrylated styrene-butadiene rubber, acrylonitrile-butadiene rubber, acrylonitrile-butadiene-styrene rubber, acryl rubber, butyl rubber, fluorine rubber, polytetrafluoroethylene, polyethylene, polypropylene, an ethylene-propylene copolymer, polyethylene oxide, polyvinylpyrolidone, polyepichlorohydrin, polyphosphazene, polyacrylate, polyacrylonitrile, polystyrene, ethylene propylene diene copolymer, polyvinylpyridine, chlorosulfonated polyethylene, latex, polyester resin, acryl resin, phenolic resin, epoxy resin, polyvinylalcohol, carboxymethyl cellulose, hydroxypropylmethyl cellulose, hydroxypropyl cellulose, diacetyl cellulose, and any combinations thereof.

In some embodiments, the first polymer binder comprises a polar functional group able to chemically bind to the first nanoparticles.

In some embodiments, the first nanoparticles are polymer particles.

In some embodiments, the polymer particles are polyurethane.

In some embodiments, the first nanoparticles have no glass transition temperature.

In some embodiments, the first nanoparticles are polymer particles or inorganic particles.

In some embodiments, the polymer particles are cross-linked polymer particles.

In some embodiments, the cross-linked polymer particles are cross-linked polymethylmethacrylate.

In some embodiments, the inorganic particles comprise at least one selected from colloidal silica, α-alumina, γ-alumina, zirconium oxide, magnesium fluoride, and any combinations thereof.

In some embodiments, the polar functional group is at least one selected from a carboxyl group, a hydroxy group, an amine group, and a glycidyl group.

In some embodiments, the first nanoparticles comprise a polar functional group able to chemically bind to the first polymer binder.

In some embodiments, the first polymer binder has a gel content of about 90% or less.

In some embodiments, the binder composition further comprises a coupling agent for chemically binding the first nanoparticles and the first polymer binder.

In some embodiments, the binder composition further comprises a solvent.

In some embodiments, the first nanoparticles are inert with respect to at least one of a protonic acid and a Lewis acid.

In some embodiments, the first nanoparticles are inorganic particles.

In some embodiments, the first nanoparticles comprise at least one selected from a metal fluoride, a metal nitride, and a metal carbide.

In some embodiments, the first nanoparticles comprise magnesium fluoride.

In some embodiments, the first nanoparticles are not colored when dipped in an organic electrolyte solution including a lithium salt at about 70° C. for about 72 hours.

In some embodiments, the coupling agent does not comprise a metalloid element.

In some embodiments, the first polymer binder has a breaking strength of about 25 Kg/cm2 or greater, as measured in a binder film impregnated with an electrolyte.

In some embodiments, the first polymer binder has a breaking strength of about 30 Kg/cm2 or greater, as measured in a binder film impregnated with an electrolyte.

Another aspect of the present technology relates to the binder composition comprises:
 a filler comprising the first nanoparticles; and
 a matrix comprising the first polymer binder,
 wherein the filler is dispersed in an elastic matrix of the first polymer binder.

In some embodiments, the first nanoparticles are chemically bound with the first polymer binder.

One more aspect of the present disclosure relates to an anode comprising:
 an anode active material; and
 the binder composition for a secondary battery described herein.

In some embodiments, the anode active material comprises at least one selected from the group consisting of Si, Sn, Pb, Ge, Al, SiOx, wherein x is more than 0 and equal to or less than 2(0<x≤2), SnOy wherein x is more than 0 and equal to or less than 2 (0<y≤2), Li4Ti5O12, TiO2, LiTiO3, and Li2Ti3O7.

Some embodiments of the present disclosure relates to a lithium battery comprising the anode described herein.

DETAILED DESCRIPTION OF CERTAIN INVENTIVE EMBODIMENTS

Figure 1:
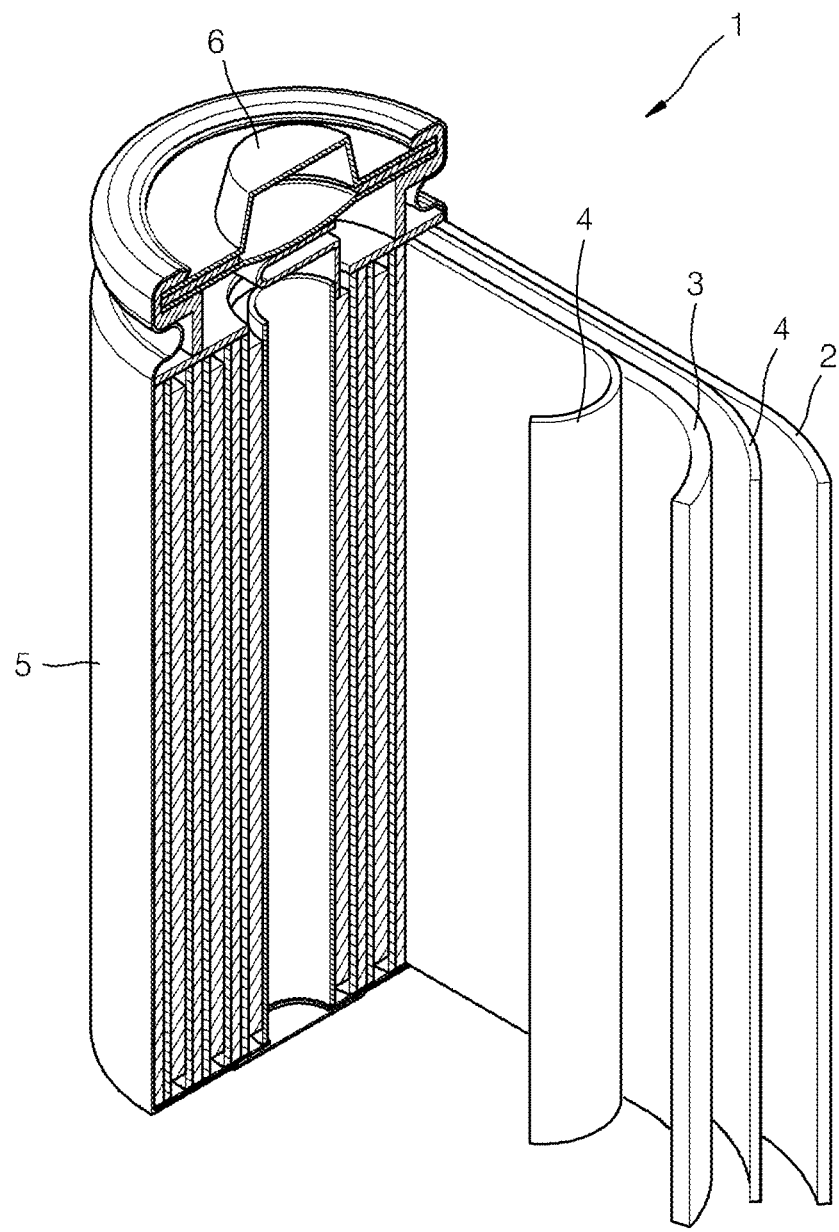
FIG. 1 is a schematic view of a lithium battery according to an embodiment of the present invention.

Reference will now be made in detail to embodiments of a binder composition for a secondary battery, an anode including the binder composition, and a lithium battery employing the anode, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As used herein, the term "binder composition" refers to a binder composition including or not including a solvent.

The binder composition described herein can be made to increase the flexibility of a conventional binder for a secondary battery that has a high glass transition temperature (Tg) or strong intensity, and to maintain maintaining flexibility of a binder and a strong intensity of the binder in the form of a film impregnated with electrolyte. Therefore, the binder composition for a secondary battery described herein can maintain flexibility and strength strong enough to suppress expansion of an electrode by properly combining a flexible polymer binder with nanoparticles having a glass transition temperature (Tg) of about 60° C. or greater.

In some embodiments, a binder composition for a secondary battery includes: a first nanoparticles having a glass transition temperature of about 60° C. or greater and an average particle diameter of about 100 nm or less; and a first polymer binder having a glass transition temperature of about 20° C. or less. Due to the inclusion of the first nanoparticles having a glass transition temperature of about 60° C. or greater, and an average particle diameter of about 100 nm or less, the binder composition for a secondary battery may be strong enough to absorb and/or suppress a volumetric change of an anode active material during the charging and discharging steps. Accordingly, a lithium battery including the binder composition may have good cycle characteristics. The binder composition for a secondary battery may maintain a high elastic modulus at a high temperature of about 60° C. or greater due to the inclusion of the first nanoparticles. The first polymer binder in the binder composition for a secondary battery may be non-shaped and may serve as a matrix.

The first nanoparticles in the binder composition for a secondary battery may have an average particle diameter of about 1 nm to about 100 nm. In some embodiments, the first nanoparticles may have an average particle diameter of about 5 nm to about 100 nm, and in some embodiments, an average particle diameter of about 10 nm to about 100 nm, and in some other embodiments, an average particle diameter of about 20 nm to about 100 nm, and in still other embodiments, an average particle diameter of about 30 nm to about 100 nm. For example, the first nanoparticles may have an average particle diameter of about 30 nm to about 80 nm, and in some embodiments, an average particle diameter of about 40 nm to about 80 nm, and in some other embodiments, an average particle diameter of about 50 nm to about 80 nm, and in still other embodiments, an average particle diameter of about 60 nm to about 80 nm. When the average particle diameter of the first nanoparticles is greater than 100 nm, the binder composition may have weak strength. When the average particle diameter of the first nanoparticles is too small, the solid content of the binder composition may be too small to enable easy handing.

The binder composition for a secondary battery may have increased strength due to the inclusion of the first nanoparticles having a glass transition temperature of about 60° C. or greater. In some embodiments, the first nanoparticles of the binder composition for a secondary battery may have a glass transition temperature of greater than 60° C., and in some embodiments, a glass transition temperature of about 70° C. or greater, and in some other embodiments, a glass transition temperature of about 80° C. or greater, and in still other embodiments, a glass transition temperature of about 90° C. or greater. For example, the first nanoparticles of the binder composition for a secondary battery may substantially not have a glass transition temperature. This means that a significant glass transition temperature of the first nanoparticles may not be accurately determined due to a minor or no slop change in the differential scanning calorimetric (DSC) plot of heat flow with respect to temperature.

As used herein, the first nanoparticles having a glass transition temperature (Tg) of about 60° C. or greater may exclude nanoparticles having a glass transition temperature of less than about 60° C. In other words, the first nanoparticles having a glass transition temperature (Tg) of about 60° C. or greater may refer to particles unable to soften, like inorganic particles or highly cross-linked particles not having a glass transition temperature.

The first nanoparticles having a glass transition temperature 60° C. or greater and the polymer binder having a glass transition temperature of about 20° C. or less are used in combination to suppress expansion of an electrode caused from charging and discharging of a battery. To this end, the first nanoparticles may have a glass transition temperature of about 60° C. or greater, given that an operation temperature of the battery may reach about 60° C.

When the glass transition temperature of the first nanoparticles is less than 60° C., the first nanoparticles may become soft, not strong enough to suppress the expansion of the electrode when the operating condition of the battery reaches about 60° C. Accordingly, the first nanoparticles should be particles that do not become soft until a temperature reaches about 60° C. Examples of the particles having a glass transition temperature of about 60° C. or greater include organic particles and inorganic particles.

When the first nanoparticles are organic particles, the first nanoparticles may be the first polymer particles. In some embodiments, the binder composition for a secondary battery may further include at least two different types of polymer particles, for example, second polymer particles and third polymer particles.

When the first nanoparticles are inorganic particles, the first nanoparticles may include, for example, particles of colloidal silica, α-alumina, γ-alumina, zirconium oxide, or magnesium fluoride, but are not limited thereto. The first nanoparticles may be any inorganic particles available in the art.

For example, the first nanoparticles may include at least one selected from the first polymer particles, the inorganic particles, and combinations thereof.

The binder composition for a secondary battery may have increased strength and increased adhesion due to the inclusion of the first polymer binder having a glass transition temperature of 20° C. or less. In some embodiments, the first polymer binder may have a glass transition temperature of about −60° C. to about 20° C. For example, the first polymer binder may have a glass transition temperature of about −60° C. to less than 20° C., and in some embodiments, a glass transition temperature of about −55° C. to about 20° C., and in some other embodiments, a glass transition temperature of about −50° C. to about 20° C., and in still other embodiments, a glass transition temperature of about −40° C. to about 20° C., and in yet other embodiments, a glass transition temperature of about −30° C. to about 20° C., and in still yet other embodiments, a glass transition temperature of about −20° C. to about 20° C. In some embodiments, the first polymer binder may have a glass transition temperature of about −60° C. to about 10° C.

The first nanoparticles may have a polar functional group on the particle surfaces thereof. The polar functional group may form any of a variety of bonds, for example, a hydrogen bond or a covalent bond, with the first polymer binder. Non-limiting examples of the polar functional group are a carboxyl group, a hydroxy group, and an amine group. The polar functional group may be any polar functional group able to form a bond with the first polymer binder.

The first polymer binder may have a polar functional group in a region of a backbone and/or side chain thereof. The polar functional group of the first polymer binder may form any of a variety of bonds, for example, a hydrogen bond or a covalent bond, with the first nanoparticles. Non-limiting examples of the polar functional group of the first polymer binder include a carboxyl group, a hydroxy group, and an amine group. The first polymer binder may have any polar functional group able to form a bond with the first nanoparticles.

The first nanoparticles and the first polymer binder may form a composite, through a physical bond, for example, a van der Waals bond. The first nanoparticles and the first polymer binder may further form a composite via a chemical bond resulting from reaction between the polar functional group on the surfaces of the first nanoparticles and the polar functional group at a terminal of the first polymer binder.

The binder composition for a secondary battery may further include at least one of second polymer particles having a different glass transition temperature from that of the first nanoparticles. For example, the binder composition for a secondary battery may include at least two different kinds of polymer particles having different glass transition temperatures. In some embodiments, the binder composition may include at least three different kinds of polymer particles having different glass transition temperature from one another.

The binder composition for a secondary battery may further include at least one of a second polymer binder having a different glass transition temperature from that of the first polymer binder. For example, the binder composition for a secondary battery may include at least two different kinds of polymer binders having different glass transition temperatures. In some embodiments, the binder composition may include at least three different kinds of polymer binders having different glass transition temperature from one another.

Hereinafter, the first polymer binder may refer to a combination of the first and second polymer binders, unless stated otherwise. This may be the same for the first nanoparticles.

The binder composition for a secondary battery may include about 1 part to about 60 parts by weight on a dry weight basis of the first nanoparticles based on 100 parts by weight on a dry weight basis of the first polymer binder. For example, the binder composition for a secondary battery may include about 2 part to about 60 parts by weight on a dry weight basis of the first nanoparticles, and in some embodiments, about 5 parts to about 60 parts by weight on a dry weight basis of the first nanoparticles, and in some other embodiments, about 5 parts to about 50 parts by weight on a dry weight basis of the first nanoparticles, and in still other embodiments, about 5 parts to about 40 parts by weight on a dry weight basis of the first nanoparticles, each based on 100 parts by weight on a dry weight basis of the first polymer binder. When the amount of the first nanoparticles is less than the ranges described above, the binder composition may have less elasticity. On the other hand, when the amount of the first nanoparticles is higher than the ranges described above, impregnation of the binder composition with electrolyte may be hindered.

In an anode of a lithium secondary battery, a metal-based anode active material is mostly used in a combination with a carbonaceous material in order to suppress a large volumetric change of the material during the charging and discharging steps. When a higher proportion of the metal-based anode active material is used, expansion of the electrode is more likely to occur, and accordingly, it is required to increase a proportion of the first nanoparticles to the first polymer binder. On the other hand, when a low proportion of the metal-based anode active material is used, expansion of the electrode is less likely to occur, and accordingly, the proportion of the first nanoparticles to the first polymer binder may be reduced to obtain a softer binder, thereby increasing flexibility of the electrode. When the first polymer binder has a high glass transition temperature, the resulting binder for a secondary battery may be hard. In this regard, a lower proportion of the first nanoparticles to the first polymer binder may be used to ensure the flexibility of the electrode and to prevent a negative effect on the electrode.

In some embodiments, in the binder composition for a secondary battery, the first particles may be dispersed in the first polymer binder. The first nanoparticles may be dispersed in a matrix of the first polymer binder. The first nanoparticles may be dispersed in the form of isolated single particles in the first polymer binder. In some embodiments, the first nanoparticles may be dispersed in the form of secondary particles as agglomerates of a plurality of first nanoparticles in the matrix of the first polymer binder.

The first nanoparticles may be uniformly dispersed in the first polymer binder. In some embodiments, the first nanoparticles may be nonuniformly (or randomly) distributed in the first polymer binder.

In some embodiments, the binder composition for a secondary battery may include a first polymer binder aggregate of at least two first polymer binders. In this regard, the first nanoparticles may be disposed in an interface between the at least two first polymer binders of the first polymer binder aggregate. In some embodiments, the first nanoparticles may be disposed among a plurality of first polymer binders. In some embodiments, the first nanoparticles may be nonuniformly disposed in interfaces of the plurality of first polymer binders.

In some other embodiments, the first nanoparticles may be disposed in an interface between the first polymer binder and other battery components. For example, the first nanoparticles may be disposed in an interface between the first polymer binder and an electrolyte, and in some embodiments, in an interface between the first polymer binder and an anode active material, and in some other embodiments, in an interface between the first polymer binder and a conducting agent, and in still other embodiments, in an interface between the first polymer binder and a current collector, and in yet other embodiments, in an interface between the first polymer binder and a separator. In still yet other embodiments, the first nanoparticles may be nonuniformly disposed in an interface between the first polymer binder and any of the above-listed other battery components.

The first nanoparticles are not specifically limited, and may be any polymer particles having a glass transition temperature of about 60° C. or higher and an average particle diameter of about 100 nm or less. In some embodiments, the first nanoparticles may include a hydrophillic functional group. The first nanoparticles may be prepared by any of a variety of methods, but not limited to, for example, emulsion polymerization or solution polymerization. Reaction conditions of these methods may also be appropriated adjusted by one of ordinary skill in the art.

For example, the first nanoparticles may be a (meth) acrylic acid ester-based water-dispersible material; a diene-based latex; a water-dispersible form of ethylene-acrylate, carboxyl modified polyethylene, polyurethane, nylon, or polyester. These materials may also be cross-linked by a cross-linking agent.

For example, when the first nanoparticles are a (meth) acrylic acid ester-based water-dispersible material or a diene-based latex, the first nanoparticles may be prepared by polymerization of radical polymerizable monomers by emulsion polymerization, suspension polymerization, or dispersion polymerization.

In some embodiments, the (meth)acrylic acid ester-based water-dispersible material may be prepared by polymerization of ethylenically unsaturated carboxylic acid ester with monomers copolymerizable with the ethylenically unsaturated carboxylic acid ester.

Non-limiting examples of the ethylenically unsaturated carboxylic acid ester are acrylic acid alkyl esters, such as methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethyl hexyl acrylate, isobornyl acrylate, hydroxypropyl acrylate, lauryl acrylate, and substituted alkyl esters thereof; methacrylic acid alkyl esters, such as methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethyl hexyl methacrylate, hydroxy propyl methacrylate, and lauryl methacrylate, and substituted alkyl esters thereof; crotonic acid alkyl esters, such as methyl crotonate, ethyl crotonate, propyl crotonate, butyl crotonate, isobutyl crotonate, n-amyl crotonate, isoamyl crotonate, n-hexyl crotonate, 2-ethyl-hexyl crotonate, and hydroxypropyl crotonate, and substituted alkyl esters thereof; amino group-containing methacrylic acid esters, such as dimethylamino ethyl methacrylate, and diethylamino ethyl methacrylate; alkoxy group-containing methacrylic acid esters, such as methoxy polyethylene glycol mono methacrylic acid ester; and unsaturated dicarboxylic acid monoesters, such as monooctyl maleate, monobutyl maleate, monooctyl itaconate. Any ethylenically unsaturated carboxylic acid esters known in the art may be used.

Non-limiting examples of the monomer copolymerizable with the ethylenically unsaturated carboxylic acid ester are unsaturated carboxylic acids, such as acrylic acid, methacrylic acid, itaconic acid, and fumaric acid; carboxylic acid esters having at least two carbon-carbon double bonds, such as diethylene glycol dimethacrylate, diethylene glycol dimethacrylate, and trimethylol propane triacrylate; styrene-based monomers, such as styrene, chlorostyrene, vinyltoluene, t-butyl styrene, vinyl benzoic acid, methyl vinyl benzoic acid, vinyl naphthalene, chloromethyl styrene, hydroxy methyl styrene, α-methyl styrene, and divinyl benzene; amide-based monomers, such as acryl amide, N-methylol acryl amide, acryl amide-2-methyl propane sulfonic acid; α,β-unsaturated nitrile compounds, such as acrylonitrile, and methacrylonitrile; olefins, such as ethylene and propylene; diene-based monomers, such as butadiene and isoprene; halogen atom-containing monomers, such as vinyl chloride, and vinylidene chloride; vinyl esters, such as vinyl acetate, vinyl propionate, vinyl butyrate, and vinyl benzoate; vinyl ethers, such as allyl glycidyl ether, methyl vinyl ether, ethyl vinyl ether, butyl vinyl ether; vinyl ketones, such as methyl vinyl ketone, ethyl vinyl ketone, butyl vinyl ketone, hexyl vinyl ketone, and isoprophenyl vinyl ketone; and heterocyclic vinyl compounds, such as N-vinyl pyrrolidone, vinylpyridine, and vinylimidazole. Any monomers used in the art that are copolymerizable with ethylenically unsaturated carboxylic acid esters may be used.

For example, the monomer copolymerizable with the ethylenically unsaturated carboxylic acid ester may be at least one selected from the group consisting of carboxylic acid esters having at least two carbon-carbon double bonds, amide-based monomers, α,β-unsaturated nitrile compounds, and vinyl ethers.

The diene-based latex may be a copolymer obtained from an aromatic vinyl unit (or monomer), a conjugated diene unit, an ethylenically unsaturated carboxylic acid ester unit, and an ethylenically unsaturated carboxylic acid unit. Non-limiting examples of the aromatic vinyl unit include styrene, α-methyl styrene, p-methyl styrene, vinyl toluene, chloro styrene, and divinyl benzene. In some embodiments, the aromatic vinyl unit may be styrene. The conjugated diene unit may be a conjugated diene compound, such as 3-butadiene, isoprene, 2-chloro-1,3-butadiene, and chloroprene. In some embodiments, the conjugated diene unit may be 1,3-butadiene. Non-limiting examples of the ethylenically unsaturated carboxylic acid ester unit are a (meth) acrylic acid ester, such as methyl (meth)acrylic acid, ethyl (meth) acrylic acid, n-propyl (meth)acrylic acid, i-propyl (meth) acrylic acid, n-butyl (meth)acrylic acid, i-butyl (meth) acrylic acid, n-amyl (meth)acrylic acid, i-amyl (meth)acrylic acid, hexyl (meth)acrylic acid, 2-hexyl (meth)acrylic acid, octyl (meth)acrylic acid, i-nonyl (meth)acrylic acid, decyl (meth)acrylic acid, hydroxymethyl (meth)acrylic acid, hydroxyethyl (meth)acrylic acid, and ethylene glycol (meth) acrylic acid. For example, the ethylenically unsaturated carboxylic acid ester unit may be methyl (meth)acrylic acid or butyl (meth)acrylic acid. In some embodiments, the ethylenically unsaturated carboxylic acid ester unit may be methyl (meth)acrylic acid. Non-limiting examples of the ethylenically unsaturated carboxylic acid unit are acrylic acid, (meth)acrylic acid, itaconic acid, fumaric acid, and maleic acid.

The first nanoparticles may include a polar functional group-containing compound unit that is copolymerizable with any of the above-described monomers. Non-limiting examples of the polar functional group-containing compound include but not limited to alkyl amides of ethylenically unsaturated carboxylic acids, such as (meth)acryl amide and N-methylol acryl amide; carboxylic acid vinyl esters, such as acetic acid vinyl ester and propionic acid vinyl ester; anhydrides, monoalkyl esters, and mono amides of ethylenically unsaturated dicarboxylic acids; amino alkyl esters of ethylenically unsaturated carboxylic acids, such as amino ethyl acrylate, dimethyl amino ethyl acrylate, and butyl amino ethyl acrylate; amino alkyl amides of ethylenically unsaturated carboxylic acids, such as amino ethyl acryl amide, dimethyl amino methyl methacryl amide, and methyl amino propyl methacryl amide; cyanated vinyl-based compounds, such as (meth)acrylonitrile and α-chloroacrylonitrile; and unsaturated aliphatic glycidyl esters, such as glycidyl (meth)acrylate. The polar functional group-containing compound may be any compound including a polar functional group that may be used to prepare a copolymer in the art.

In some embodiments, the above-described monomers can include polar functional groups for chemical binding with the first polymer binder. These polar functional groups of the monomers may be polar functional groups able to chemically bind with the first polymer binder or polar functional groups able to bind with the first nanoparticles and the first polymer binder via a coupling agent. Non-limiting examples of the monomers having the polar functional groups include a —OH group-containing monomer, a carboxyl group-containing monomer, a glycidyl group-containing monomer, and an amino group-containing monomer. The monomers having the polar functional groups may be any polar functional group-containing monomers available in the art.

The first nanoparticles may not swell when combined with electrolyte solution. For example, the first nanoparticles may have a degree of swelling of about 4 times or less, and in some embodiments, about 3 times or less, and in some other embodiments, about 2 times or less, in the electrolyte solution. When the degree of swelling of the first nanoparticles in the electrolyte solution is too high, the first nanoparticles may have a reduced glass transition temperature (Tg) of about 60° C. or less. As a result, it may be difficult to suppress the expansion ratio of an electrode including the binder composition for a secondary battery when the secondary battery is used in a high-temperature condition. The degree of swelling of the first nanoparticles may be obtained from the ratio of the weights of the first nanoparticles before and after the first nanoparticles are combined with the electrolyte solution. In other words, the degree of swelling of the first nanoparticles indicates a degree of absorption of the electrolyte solution within the first nanoparticles.

To suppress the degree of swelling of the first nanoparticles in the electrolyte solution, a diene-based latex including about 80 wt % of styrene and butadiene based on the total amount of monomers may be used for preparing the first nanoparticles. When an acrylic acid ester-based water-dispersible material is used for the first nanoparticles, for example, a polymer including about 80 wt % or greater, more particularly, about 85 wt % or greater, of styrene and an ethylenically unsaturated carboxylic acid ester of a higher alcohol having six or more carbons, may be used for preparing the first nanoparticles. A cross-linking structure may be introduced into the first nanoparticles by using a difunctional monomer having at least two carbon-carbon double bonds. Examples of the difunctional monomer having at least two carbon-carbon double bonds are 2-vinyl benzene, or carboxylic acid esters having at least two carbon-carbon double bonds, for example, ethylene glycol dimethacrylate, diethylene glycol dimethacrylate, and trimethylolpropane triacrylate. For example, the first nanoparticles with increased hardness may be obtained using 2-vinyl benzene.

In some embodiments, the first nanoparticles may include, but not limited to, at least one selected from polyethylene, polypropylene, ethylene-propylene copolymer, polyvinylchloride, polyvinylidenechloride, polystyrene, polyacrylonitrile, polytetrafluoroethylene, polymethylmethacrylate, polyvinylacetate, polyisoprene, polychloroprene, polyester, polycarbonate, polyamide, polyacrylate, polymethylmethacrylate, polyurethane, acrylonitrile-butadiene-styrene copolymer, polyoxyethylene, polyoxymethylene, polyoxypropylene, styrene-acrylonitrile copolymer, acrylonitrile-styrene-acrylate copolymer, styrene-butadiene copolymer, acrylated styrene-butadiene copolymer, acrylonitrile-butadiene copolymer, acrylonitrile-butadiene-styrene copolymer, acryl rubber, butyl rubber, fluorine rubber, polyvinylpyrolidone, polyepichlorohydrin, polyphosphazene, ethylene propylene diene copolymer, polyvinylpyridine, chlorosulfonated polyethylene, polysulfone, polyvinylalcohol, polyvinylacetate, thermoplastic polyesterrubber (PTEE), carboxymethyl cellulose, hydroxypropylmethyl cellulose, hydroxypropyl cellulose, and diacetyl cellulose and a cross-linked polymer thereof.

The first nanoparticles may be aqueous polymer particles or nonaqueous polymer particles. The aqueous polymer particles may refer to water-dispersible (waterborne) polymer particles able to be easily dispersed or dissolved in water.

For example, the first nanoparticles may be a water-dispersible material, such as a (meth)acrylic acid ester-based water-dispersible material, a diene-based latex, water-dispersible polyurethane, water-dispersible nylon, or water-dispersible polyester. Non-limiting examples of monomers used to prepare the first nanoparticles are ethylenically unsaturated carboxylic acid alkyl esters, for example, methylacrylate, ethylacrylate, butylacrylate, 2-ethylhexylacrylate, methyl methacrylate, butylmethacrylate, ethylmethacrylate, and 2-ethylhexylmethacrylate; cyano group-containing ethylenically unsaturated monomers, for example, acrylonitrile, methacrylonitrile, α-chloroacrylonitrile, and α-cyanoethyl acrylonitrile; conjugated diene monomers, for example, 1,3-butadiene, isoprene, 2,3-dimethyl-1,3-butadiene, 2-ethyl-1,3-butadiene, 1,3-pentadiene, and chloroprene; ethylenically unsaturated carboxylic acids, for example, acrylic acid, methacrylic acid, maleic acid, fumaric acid, and citaconic acid, and salts thereof; aromatic vinyl monomers, for example, styrene, alkylstyrene, and vinylnaphthalene; fluoroalkylvinylethers, for example, fluoroethylvinylether; non-conjugated monomers, for example, vinylpyridine, vinyl norbornene, dicyclopentadiene, and 1,4-hexadiene; α-olefins, for example, ethylene and propylene; ethylenically unsaturated amide monomers, for example, (meth)acryl amide; isocyanate-based monomers, for example, methylenediphenyldiisocyanate and toluenediisocyanate; and polyol-based monomers, for example, glycerin, ethyleneglycol, and propyleneglycol. Any monomers available in the art may be used to prepare the first nanoparticles.

The first nanoparticles may be prepared by any suitable methods, not limited to, for example, emulsion polymerization, solution polymerization, suspension polymerization, or a dispersion polymerization. Reaction conditions in these methods may be appropriately adjusted by one of ordinary skill in the art.

The first nanoparticles may be prepared by, for example, a method of emulsifying a polymer solution in which polymer particles having a Tg of about 60° C. or greater are dissolved, a method of heating a crystalline polymer in a poor solvent to a melting point or greater to be dissolved and cooling to precipitate polymer particles, or a method of forming particles of a polymer having a dissociative functional group from an alkali solution of a polymer having a dissociative functional group.

The first polymer binder may be used to provide flexibility to an electrode and ensure adhesion between an electrode active material and a current collector. The first polymer binder may be any polymer material having a glass transition temperature of about 20° C. or less. For example, the first polymer binder may include a water-dispersible functional group. The first polymer binder may be prepared by any suitable methods, not limited to, for example, emulsion polymerization or solution polymerization. Reaction conditions in these methods may be appropriately controlled by one of ordinary skill in the art.

For example, monomers that may be used to prepare the first polymer binder may be monomers that can be used in radical polymerization. The monomers for preparing the first polymer binder may be selected from a combination of the monomers for preparing the first nanoparticles described above.

In some embodiments, the monomers used to prepare the first polymer binder include polar functional groups for chemical binding with the first nanoparticles. These polar functional groups of the monomers may be polar functional groups able to chemically bind with the first nanoparticles or polar functional groups able to bind the first nanoparticles and the first polymer binder via a coupling agent. Non-limiting examples of the monomers having the polar functional groups are a —OH group-containing monomer, a carboxyl group-containing monomer, a glycidyl group-containing monomer, and an amino group-containing monomer. The monomers having the polar functional groups may be any polar functional group-containing monomers available in the art.

In some embodiments, the first polymer binder may not swell when combined with electrolyte solution. For example, the first binder polymer may have a degree of swelling of about 4 times or less, and in some embodiments, about 3 times or less, and in some other embodiments, about 2 times or less, in the electrolyte solution. When the degree of swelling of the first binder polymer in the electrolyte solution is too high, the first polymer binder may have strength that is too weak to suppress the expansion ratio of an electrode including the binder composition for a secondary battery. The degree of swelling of the first polymer binder may be obtained from the ratio of the weights of the first polymer binder before and after the first polymer binder is combined with the electrolyte solution. In other words, the degree of swelling of the first polymer binder indicates a degree of absorption of the electrolyte solution within the first polymer binder.

To suppress the degree of swelling of the first polymer binder in the electrolyte solution, a diene-based latex including about 80 wt % of styrene and butadiene based on a total amount of the monomers may be used for preparing the first binder polymer. When an acrylic acid ester-based water-dispersible material is used for the first nanoparticles, for example, a polymer including about 80 wt % or greater, for example, about 85 wt % or greater, of styrene and an ethylenically unsaturated carboxylic acid ester of a higher alcohol having six or more carbons, may be used for preparing the first polymer binder.

In some embodiments, the first polymer binder may include, but not limited to, at least one selected from the group consisting of styrene-butadiene rubber, acrylated styrene-butadiene rubber, acrylonitrile-butadiene rubber, acrylonitrile-butadiene-styrene rubber, acryl rubber, butyl rubber, fluorine rubber, polytetrafluoroethylene, polyethylene, polypropylene, an ethylene-propylene copolymer, polyethylene oxide, polyvinylpyrolidone, polyepichlorohydrin, polyphosphazene, polyacrylate, polyacrylonitrile, polystyrene, an ethylene propylene diene copolymer, polyvinylpyridine, chlorosulfonated polyethylene, latex, polyester resin, acryl resin, phenolic resin, epoxy resin, polyvinylalcohol, carboxymethyl cellulose, hydroxypropylmethyl cellulose, hydroxypropylcellulose, and diacetylcellulose. Any polymer binders available in the art may be used.

In some embodiments, the first polymer binder may be an aqueous polymer binder or a nonaqueous polymer binder. The aqueous polymer binder particles may refer to a water-dispersible(waterborne) polymer binder able to be easily dispersed or dissolved in water.

Non-limiting examples of monomers used to prepare the first polymer binder are ethylenically unsaturated carboxylic acid alkyl esters, for example, methyl methacrylate, butylmethacrylate, ethylmethacrylate, and 2-ethylhexylmethacrylate; cyano group-containing ethylenically unsaturated monomers, for example, acrylonitrile, methacrylonitrile, α-chloroacrylonitrile, and α-cyanoethyl acrylonitrile; conjugated diene monomers, for example, 1,3-butadiene, isoprene, 2,3-dimethyl-1,3-butadiene, 2-ethyl-1,3-butadiene, 1,3-pentadiene, and chloroprene; ethylenically unsaturated carboxylic acids, for example, acrylic acid, methacrylic acid, maleic acid, fumaric acid, and citaconic acid, and salts thereof; aromatic vinyl monomers, for example, styrene, alkylstyrene, and vinylnaphthalene; fluoroalkylvinylethers, for example, fluoroethylvinylether; vinylpyridine; non-conjugated monomers, for example, vinyl norbornene, dicyclopentadiene, and 1,4-hexadiene; α-olefins, for example, ethylene and propylene; ethylenically unsaturated amide monomers, for example, (meth)acryl amide. Any monomers available in the art may be used.

The first polymer binder may be prepared by any suitable methods, not limited to, for example, emulsification polymerization or solution polymerization. Reaction conditions in these methods may be appropriately controlled by one of ordinary skill in the art.

In some embodiments, the binder composition for a secondary battery may include first nanoparticles having an average particle diameter of about 100 nm or less; and a first polymer binder having a glass transition temperature of about 20° C. or less, wherein the first polymer binder may include a polar functional group able to chemically bind with the first nanoparticles. The binder composition may have high strength due to the inclusion of the first nanoparticles having an average particle diameter of about 100 nm or less, and the first polymer binder having a glass transition temperature of about 20° C. or less and having a polar functional group able to bind with the first nanoparticles, and thus may absorb and/or suppress a volumetric change of an anode active material during charging and discharging. Accordingly, a lithium battery including the binder composition may have good cycle characteristics. The binder composition for a secondary battery may maintain a high elastic modulus at a temperature of about of 60° C. or higher, due to the polar functional group of the first polymer binder able to bind with the first nanoparticles. The first polymer binder in the binder composition for a secondary battery may not have any particular shape and may serve as a matrix.

The first nanoparticles may have a glass transition temperature of about 60° C. or higher and may be, for example, polymer particles. For example, the first nanoparticles having a glass transition temperature of about 60° C. or higher may be, but not limited to, polyurethane particles. The first nanoparticles may any polymer particles having a glass transition temperature of about 60° C. or higher available in the art.

In some embodiments, the first nanoparticles of the binder composition for a secondary battery may substantially not have a glass transition temperature. This means that a significant glass transition temperature of the first nanoparticles may not accurately determined due to a minor or no slop change in a differential scanning calorimetric (DSC) plot of heat flow with respect to temperature.

As used herein, the first nanoparticles substantially not having a glass transition temperature (Tg) may refer to particles unable to soften, like inorganic particles or highly cross-linked particles not having a glass transition temperature.

The first nanoparticles not having a glass transition temperature may be cross-linked polymethylmethacrylate particles. For example, the first nanoparticles not having a glass transition temperature may be particles of at least one selected from the group consisting of colloidal silica, α-alumina, γ-alumina, zirconium oxide, and magnesium fluoride, but are not limited thereto. The first nanoparticles not having a glass transition temperature may be any inorganic particles available in the art.

The first nanoparticles having a glass transition temperature 60° C. or greater or substantially not having a glass transition temperature and the first polymer binder having a glass transition temperature of about 20° C. or less are used in combination to suppress expansion of an electrode caused from charging and discharging of a battery. To this end, the first nanoparticles may have a glass transition temperature of about 60° C. or greater. In some embodiments, the first nanoparticles may not have a glass transition temperature, given that an operation temperature of the battery may reach about 60° C.

When the glass transition temperature of the first nanoparticles is less than 60° C., the first nanoparticles may become soft, not strong enough to suppress the expansion of the electrode when the operation temperature of the battery reaches about 60° C. Accordingly, the first nanoparticles may be particles that may not become soft until a temperature of about 60° C.

The first nanoparticles may include organic particles as first polymer particles. In some embodiments, the binder composition for a secondary battery may further include at least two different types of polymer particles, for example, second polymer particles and third polymer particles.

In some embodiments, the first nanoparticles may include a polar functional group able to chemically bind with the first polymer binder. For example, the first nanoparticles may have a polar functional group on particle surfaces thereof. The polar functional group may form any of a variety of bonds, for example, a hydrogen bond or a covalent bond, with the first polymer binder. Non-limiting examples of the polar functional group are a carboxyl group, a hydroxy group, and an amine group. The polar functional group may be any polar functional group able to form a bond with the first polymer binder.

In some embodiments, the first polymer binder may include a polar functional group able to chemically bind with the first nanoparticles. For example, the first polymer binder may have a polar functional group in a region of a backbone and/or side chain thereof. The polar functional group of the first polymer binder may form any of a variety of bonds, for example, a hydrogen bond or a covalent bond, with the first nanoparticles. Non-limiting examples of the polar functional group of the first polymer binder are a carboxyl group, a hydroxy group, an amine group, and a glycidyl group. The first polymer binder may have any polar functional group able to form a bond with the first nanoparticles.

In some embodiments, the first nanoparticles and the first polymer binder may form a composite via a physical bond, for example, a van der Waals bond. In some embodiments, the first nanoparticles and the first polymer binder may form a composite further via a chemical bond resulting from reaction between the polar functional group on the surfaces of the first nanoparticles and the polar functional group at a terminal of the first polymer binder.

In some embodiments, the gel content of the first polymer binder in the binder composition for a secondary battery may be about 90% or less. The binder composition for a secondary battery include a combination of the first nanoparticles and the first polymer binder having a polar functional group able to chemically bind with the first nanoparticles, to suppress expansion of an electrode. In this regard, to facilitate the binding of the first polymer binder and the first nanoparticles, the first polymer binder may have high mobility until it chemically links with the first nanoparticles.

When the first polymer binder is a diene-based latex, the gel content of the first polymer binder may be about 90% or less, and in some embodiments, about 80% or less, and in some other embodiments, about 70% or less.

When the first polymer binder is an acrylic acid ester-based emulsion, a cross-linked structure may be introduced in the first polymer binder. Accordingly, a reduced amount of a difunctional monomer may be used. For example, the amount of the difunctional monomer may be about 1 wt % or less, for example, about 0.5 wt % or less, based on a total weight of the monomer. Non-limiting examples of the difunctional monomer, having at least two carbon-carbon double bonds in a molecule, are 2-vinyl benzene, or carboxylic acid esters having at least two carbon-carbon double bonds, for example, ethylene glycol dimethacrylate, diethylene glycol dimethacrylate, and trimethylol propane triacrylate.

For example, the first polymer binder may be prepared by a common method, for example, emulsion polymerization, suspension polymerization, or dispersion polymerization.

A common emulsifier or dispersant commonly used in an emulsion polymerization, suspension polymerization or dispersion polymerization method may be used. Non-limiting examples of the emulsifier are benzenesulfonic acid salts, such as sodium dodecylbenzene sulfonate and sodium dodecyl phenyl ether sulfonate; alkyl sulfates, such as sodium lauryl sulfate and sodium tetradecyl sulfate; sulfosuccinates, such as dioctyl sodium sulfosuccinate and dihexyl sodium sulfosuccinate; fatty acid salts, such as sodium laurate; epoxy sulfates, such as sodium polyoxyethylene lauryl ether sulfate, and sodium polyoxyethylene nonylphenyl ester sulfate; alkane sulfonate; sodium alkyl phosphate esters; and nonionic emulsifiers, such as polyoxyethylene nonylphenyl ether, polyoxyethylene sorbitan lauryl ether, a polyoxyethylene-polyoxypropylene block copolymer. These emulsifiers may be used alone or in a combination of at least two thereof. An amount of the emulsifier or dispersant may be arbitrarily determined to be, for example, about 0.01 parts to about 10 parts by weight based on 100 parts by weight of a total amount of the monomer used. In some embodiments, no emulsifier or dispersant may be used depending on polymerization conditions.

In some embodiments, a molecular weight control agent may also be used to prepare the first polymer binder. When the first polymer binder is a diene-based latex, a molecular weight control agent selected from, for example, mercaptanes, such as t-dodecyl mercaptane, n-dodecyl mercaptane, and n-octyl mercaptane; halogenated hydrocarbons, such as carbon tetrachloride and carbon tetrabromide; terpinolene; and α-methyl styrene dimer, may be used.

The molecular weight control agent may be added before or during polymerization. The amount of the molecular weight control agent may be in the range of about 0.01 parts to about 10 parts by weight, for example, about 0.1 parts to about 5 parts by weight, each based on 100 parts by weight of the monomer used.

When the first polymer binder is an acrylic acid ester-based water-dispersible material, the molecular weight control agent may not be added, since the molecular weight of the first polymer binder may be adjusted by changing the polymerization reaction temperature and the rate of monomer addition.

In some embodiments, a polymerization initiator that may be used in common emulsion polymerization, dispersion polymerization, or suspension polymerization may be used to prepare the first polymer binder. Non-limiting examples of the polymerization initiator are persulfate salts, such as potassium persulate and ammonium persulfate; hydrogen peroxides; and organic peroxides, such as benzoyl peroxide and cumene hydroperoxide. These polymerization initiators may be used alone or in a combination with a reducing agent, such as sodium sulfite, sodium thiosulfate, or ascorbic acid. Examples of the polymerization initiator are azo compounds, such as 2,2'-azobisisobutyronitrile (AIBN), 2,2'-azobis(2,4-dimethylvaleronitrile), 2,2'-azobis(4-methoxy-2,4-dimethylvaleronitrile), dimethyl-2,2'-azobisisobutyrate, and 4,4'-azobis(4-cyanopentanoic acid); and amidine compounds, such as 2,2'-azobis(2-amino-di-propane)dihydrochloride, 2,2'-azobis(N,N'-dimethyleneisobutylamidine), and 2,2'-azobis(N,N'-dimethyleneisobutylamidine)dihydrochloride, which may be used alone or in a combination of at least two thereof. The amount of the polymerization initiator may be in the range of about 0.01 parts to about 10 parts by weight, and in some embodiments, about 0.1 parts to about 10 parts by weight, and in some other embodiments, about 0.1 parts to about 5 parts by weight, each based on 100 parts by weight of the monomer used.

In some embodiments, the binder composition for a secondary battery may optionally further include an anti-aging agent, anti-staling agent, or an anti-foaming agent.

In some embodiments, the binder composition for a secondary battery may further include a coupling agent. The coupling agent may form a covalent bond by reaction with the polar functional group of the first nanoparticles and/or the first polymer binder. For example, the first nanoparticles and the first polymer binder may be more strongly bound to each other by the coupling agent. The coupling agent, in the binder composition for a secondary battery, may be present as a reaction product with the first nanoparticles and/or the first polymer binder. An example of the coupling agent for binding the first nanoparticles and the first polymer binder may be any coupling agent that may crosslink the first nanoparticles having a glass transition temperature of about 60° C. or greater and the first polymer binder having a glass transition temperature of about 20° C. or less. Any coupling agent that may react with a polar functional group of the first nanoparticles and the first polymer binder may be used.

In some embodiments, the coupling agent may include a functional group reactive to a polar functional group. In some embodiments, the coupling agent may include a functional group reactive to, for example, a carboxyl group, a hydroxyl group, an amine group, or water.

For example, the coupling agent may be a carbodiimide-based compound. Non-limiting examples of the binder are N,N'-di-o-tolylcarbodiimide, N,N'-diphenylcarbodiimide, N,N'-dioctyldecylcarbodiimide, N,N'-di-2,6-diethylphenylcarbodiimide, N-tolyl-N' cyclohexylcarbodiimide, N,N'-di-2,6-diisopropylphenylcarbodiimide, N,N'-di-2,6-di-tertiary-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, N,N'-di-p-tolylcarbodiimide, p-phenylene-bis-di-o-tolylcarbodiimide, p-phenylene-bisdicyclohexylcarbodiimide, hexamethylene-bisdicyclohexylcarbodiimide, ethylene-bisdiphenylcarbodiimide, a homopolymer of benzene-2,4-diisocyanato-1,3,5-tris(1-methylethyl), a copolymer of 2,4-diisocyanato-1,3,5-tris(1-methylethyl) and 2,6-diisopropyl diisocyanate, and a combination thereof. Any compound used as a carbodiimide-based compound may be used as a coupling agent. The carbodiimide-based compound as the coupling agent may be present in the form of a reaction product with the first nanoparticles and/or the first polymer binder in the binder composition. For example, the carbodiimide-based compound may be present in the form of a reaction product having a new covalent bond resulting from the reaction between a diamide bond of the carbodiimide-based compound and a polar functional group on the surface of the first nanoparticles.

For example, the coupling agent may be a silane coupling agent. For example, the silane coupling agent may include at least one selected from the group consisting of an alkoxy group, a halogen group, an amino group, a vinyl group, a glycidoxy group, an aryloxy group, and a hydroxyl group. In some embodiments, the silane coupling agent may be at least one selected from the group consisting of vinylalkylalkoxysilane, epoxyalkylalkoxysilane, mercaptoalkylalkoxysilane, vinylhalosilane, and alkylaryloxysilane. In some other embodiments, the silane coupling agent may be at least one selected from the group consisting of vinyltris(β-methoxyethoxy)silane, γ-methacryloxypropyltrimethoxysilane, γ-glycidoxypropyltrimethoxysilane, β-(3,4-epoxycyclohexyl)ethyltrimethoxysilane, γ-glycidoxypropylmethyldiethoxysilane, γ-aminopropyltriethoxysilane, γ-mercaptopropyltrimethoxysilane, γ-chloropropyltrimethoxysilane, vinyltrichlorosilane, and methyltriacetoxysilane. However, embodiments of the present invention are not limited thereto. Any silane coupling agents available in the art may be used.

For example, the coupling agent may be a hydrazine compound, an isocyanate compound, a melamine compound, a urea compound, an epoxy compound, a carbodiimide compound, or an oxazoline compound, which may be used alone or in a combination of at least two thereof. In some other embodiments, the coupling agent may be an oxazoline compound, a carbodiimide compound, an epoxy compound, or an isocyanate compound.

For example, the coupling agent may be a cross-linking agent having self crosslinkability or a polydentate ligand, or any other commercially available common cross-linking agent.

Non-limiting examples of the hydrazine compound are APA-M950, APA-M980, APA-P250, and PAP-P280 (available from Otsuka Chemical Co., Tokyo, Japan). Non-limiting examples of the isocyanate compound are BASONAT PLR8878 and BASONAT HW-100 (available from BASF Co., Ludwigshafen, Germany), and BAYHYDUR 3100 and BAYHYDUR VPLS2150/1 (available from SUMITOMO BAYER URETHANE Co., Hyogo-ken, Japan). A non-limiting example of the melamine compound is CYMEL 325 (available from Mitsui SciTech Co., Tokyo, Japan). A non-limiting example of the urea compound is BECKAMINE (available from DIC Co., Tokyo, Japan). Non-limiting examples of the epoxy compound are EM-150 and EM-101, which are DENACOL series of Nagase Chemtech Co., and EM-0517, EM-0526, EM-051R, and EM-11-50B, which are ADEKARESIN series of ADEKA Co. Non-limiting examples of the carbodiimide compound are SV-02, V-02, V-02-L2, V-04, E-01, E-02, V-01, V-03, V-07, V-09, and V-05, which are CARBODILITE series of Nisshinbo Chemical Inc., Tokyo, Japan. Non-limiting examples of the oxazoline compound are WS-500, WS-700, K-1010E, K-1020E, K-1030E, K-2010E, K-2020E, and K-2030E, which are EPOCROS series of Nippon Shokubai Co., Ltd. Nippon Shokubai Co., Ltd These compounds are commercially available as dispersions or solutions including cross-linking agents.

In some embodiments, in the binder composition for a secondary battery, the amount of the coupling agent may be about 10 wt % or less on a dry weight basis based on the total weight of the reactants. For example, the amount of the coupling agent may be about 5 wt % or less, and in some embodiments, about 3 wt % or less, each on a dry weight basis based on the total weight of the reactants. For example, the amount of the coupling agent used to prepare the binder composition may be in a range of from about 0 wt % to about 3 wt % on a dry weight basis of the total weight of the reactants.

The binder composition for a secondary battery may have a breaking strength of about 30 kg/cm$^2$ or greater, as measured in a binder film impregnated with electrolyte solution. For example, the binder composition for a secondary battery may have a breaking strength of about 30 kg/cm$^2$ or greater, and in some embodiment, about 35 kg/cm$^2$ or greater, and in some other embodiments, about 40 kg/cm$^2$ or greater, and in still other embodiments, about 50 kg/cm$^2$ or greater, and in yet other embodiments, about 60 kg/cm$^2$ or greater, and in still yet other embodiments, about 70 kg/cm$^2$ or greater, as measured in a binder film of the binder composition at a tensile speed of about 100 cm/min after impregnating the film with an electrolyte solution and wiping an electrolyte solvent from the film.

The amount of any of the binder compositions for a secondary battery described above, prepared from a combination of the first nanoparticles having a glass transition temperature or about 60° C. or greater and the first polymer binder having a glass transition temperature of about 20° C. or less may be in a range of about 0.5 parts to about 10 parts by weight, and in some embodiments, about 0.8 parts to about 3 parts by weight, each based on 100 parts by weight of an anode active material. When the amount of the binder composition for a secondary battery is less than the ranges described above, expansion of the electrode during charging and discharging may not be prevented. On the other hand, when the amount of the binder composition for a secondary battery is above the ranges described above, a proportion of the binder composition in the electrode is too high to obtain sufficient battery capacity, and the electrode may have an increased resistance.

Any of the binder compositions for a secondary battery according to the above-described embodiments may form a binder composition dispersion when including a solvent to distribute binder particles. For example, the binder composition dispersion for a secondary battery may include: first nanoparticles having a glass transition temperature of about 60° C. or greater and an average particle diameter of about 100 nm or less; first polymer binder particles having a glass transition temperature of about 20° C. or less; and a solvent.

In the binder composition dispersion for a secondary battery, the first nanoparticles and the first polymer binder may be presented in the form of particles dispersed in a solvent. In some embodiments, the binder composition dispersion for a secondary battery may be in the form of an emulsion. The pH of the binder composition dispersion for a secondary battery may be in a range of about pH 7 to about pH 11 to maintain stability of the binder composition dispersion. A pH adjuster, for example, ammonia, an allaki metal hydroxide, or the like, may be used. When the particle diameters of the first nanoparticles and the first polymer binder particles dispersed in the binder composition dispersion are too small, the viscosity of the emulsion (i.e., the binder composition dispersion) may be too high to enable easy handing. On the other hands, when the particle diameters of the first nanoparticles and the first polymer binder particles dispersed in the binder composition dispersion are too large, the binder composition dispersion may have weak initial adhesion.

In some embodiments, the binder composition dispersion for a secondary battery may further include at least one different type of second polymer particles having a different glass transition temperature from that of the first nanoparticles. For example, the binder composition dispersion for a secondary battery may include at least two different types of polymer particles having different glass transition temperatures. For example, the binder composition dispersion for a secondary battery may include at least three different types of polymer particles having different glass transition temperatures.

In some other embodiments, the binder composition dispersion for a secondary battery may further include at least one different type of second polymer binder particles having a different glass transition temperature from that of the first polymer binder particles. For example, the binder composition dispersion for a secondary battery may include at least two different types of polymer binder particles having different glass transition temperatures. For example, the binder composition dispersion for a secondary battery may include at least three different types of polymer binder particles having different glass transition temperatures.

As used herein, the first polymer binder particles may refer to a combination of the first polymer binder particles with any different polymer binder particles, including the second polymer binder particles. This may be the same for the first nanoparticles.

In any of the binder composition dispersions for a secondary battery according to the above-described embodiments, the amount of the first nanoparticles may be in the range of about 1 part to about 60 parts by weight based on 100 parts by weight of the first polymer binder particles. For example, the binder composition dispersion for a secondary battery may include about 1 part to about 60 parts by weight, and in some embodiments, about 5 parts to about 10 parts by weight, and in some other embodiments, about 10 parts to about 60 parts by weight, each on a dry weight basis of the first nanoparticles based on 100 parts by weight of the first polymer binder particles. When the amount of the first nanoparticles is less than these ranges, the binder composition for a secondary battery that is prepared from the binder composition dispersion may have reduced elasticity. On the other hand, when the amount of the first nanoparticles is above these ranges, it may be difficult to impregnate a binder composition for a secondary battery that is prepared from the binder composition dispersion, with electrolyte solution.

In any of the binder composition dispersions for a secondary battery described herein, the first nanoparticles and the first polymer binder particles may be mixed with each other. For example, the first nanoparticles and the first polymer binder particles may be present uniformly mixed each other in a solvent of the binder composition dispersion for a secondary battery.

In any of the binder composition dispersions for a secondary battery according to the above-described embodiments, the first nanoparticles may have an average particle diameter of about 1 nm to about 100 nm. For example the first nanoparticles may have an average particle diameter of about 5 nm to about 100 nm, and in some embodiments, about 10 nm to about 100 nm, and in some other embodiments, about 20 nm to about 100 nm, and in still other embodiments, about 30 nm to about 100 nm. For examples, the first nanoparticles may have an average particle diameter of about 30 nm to about 80 nm, and in some embodiments, about 40 nm to about 80 nm, and in some other embodiments, about 50 nm to about 80 nm, and in still other embodiments, about 60 nm to about 80 nm. When the average particle diameter of the first nanoparticles is larger than 100 nm, a binder composition for a secondary battery that is prepared from the binder composition dispersion may have weak strength. On the other hand, when the average particle diameter of the first nanoparticles is less than these ranges, it may be difficult to handle the binder composition dispersion to prepare a binder composition for a secondary battery.

In any of the binder composition dispersions for a secondary battery according to the above-described embodiments, the first polymer binder particles may have an average particle diameter of about 50 nm to about 500 nm. For example, the first polymer binder particles may have an average particle diameter of about 60 nm to about 400 nm, and in some embodiments, about 70 nm to about 300 nm, and in some other embodiments, about 80 nm to about 200 nm. When the average particle diameter of the first polymer binder particles is within these ranges, a binder composition for a second battery that is prepared from the binder composition dispersion may have improved strength and improved elastic modulus.

In some embodiments, any of the binder composition dispersions for a secondary battery described herein, may further include a coupling agent. The coupling agent may form a covalent bond through reaction with polar functional groups on surfaces of the first nanoparticles and/or the first polymer binder particles. For example, the first nanoparticles and the first polymer binder particles may be more strongly bound to each other by the coupling agent. The coupling agent used in the binder composition dispersion for a secondary battery may be the same as that used in the above-described binder composition.

In any of the binder composition dispersions for a secondary battery described herein, the amount of the binder may be in the range of more than 0 part and less than about 10 parts by weight based on 100 parts by weight of the first polymer binder particles. For example, the binder composition dispersion for a secondary battery may include more than 0 part and less than about 5 parts by weight, and in some embodiments, more than 0 part and less than about 3 parts by weight, of the binder on a dry weight basis based on 100 parts by weight of the first polymer binder particles.

For example, in any of the binder composition dispersions for a secondary battery described herein, the mixed ratio of the first polymer binder particles, the first nanoparticles, and the binder may be about 100 parts by weight: about 10 parts to about 50 parts by weight: about 0.01 parts to about 5 parts by weight on a dry weight basis. For example, the mixed ratio of the first polymer binder particles, the first nanoparticles, and the binder may be about 100 parts by weight: about 10 parts to about 40 parts by weight: about 0.01 parts to about 3 parts by weight of the binder on a dry weight basis.

In any of the binder composition dispersions for a secondary battery described herein, the first nanoparticles may be the same materials as the first nanoparticles in the binder compositions for a secondary battery according to the above-described embodiments.

In some embodiments, the first nanoparticles may include, but not limited to, polyethylene, polypropylene, an ethylene-propylene copolymer, polyvinylchloride, polyvinylidenechloride, polystyrene, polyacrylonitrile, polytetrafluoroethylene, polymethylmethacrylate, polyvinylacetate, polyisoprene, polychloroprene, polyester, polycarbonate, polyamide, polyacrylate, polymethylmethacrylate, polyurethane, an acrylonitrile-butadiene-styrene copolymer, polyoxyethylene, polyoxymethylene, polyoxypropylene, a styrene-acrylonitrile copolymer, an acrylonitrile-styrene-acrylate copolymer, a styrene-butadiene copolymer, an acrylated styrene-butadiene copolymer, an acrylonitrile-butadiene copolymer, an acrylonitrile-butadiene-styrene copolymer, acryl rubber, butyl rubber, fluorine rubber, polyvinylpyrolidone, polyepichlorohydrin, polyphosphazene, an ethylene propylene diene copolymer, polyvinylpyridine, chlorosulfonated polyethylene, polysulfone, polyvinylalcohol, polyvinylacetate, thermoplastic polyester rubber (PTEE), carboxymethyl cellulose, hydroxypropylmethyl cellulose, hydroxypropyl cellulose, and diacetyl cellulose diacetyl cellulose and a cross-linked polymer thereof. The first nanoparticles may be a cross-linked polymer of these polymers.

The first nanoparticles may be aqueous polymer particles or nonaqueous polymer particles. The aqueous polymer particles may refer to water-dispersible(waterborne) polymer particles able to be easily dispersed or dissolved in water. The first nanoparticles may be inorganic particles as described above.

Non-limiting examples of monomers used to prepare the first nanoparticles are ethylenically unsaturated carboxylic acid alkyl esters, for example, methylacrylate, ethylacrylate, butylacrylate, 2-ethylhexylacrylate, methyl methacrylate, butylmethacrylate, ethylmethacrylate, 2-ethylhexylmethacrylate; cyano group-containing ethylenically unsaturated monomers, for example, acrylonitrile, methacrylonitrile, α-chloroacrylonitrile, and α-cyanoethyl acrylonitrile; conjugated diene monomers, for example, 1,3-butadiene, isoprene, 2,3-dimethyl-1,3-butadiene, 2-ethyl-1,3-butadiene, 1,3-pentadiene, and chloroprene; ethylenically unsaturated carboxylic acids, for example, acrylic acid, methacrylic acid, maleic acid, fumaric acid, and citaconic acid, and salts thereof; aromatic vinyl monomers, for example, styrene, alkylstyrene, and vinylnaphthalene; fluoroalkylvinylethers, for example, fluoroethylvinylether; non-conjugated diene monomers, for example, vinylpyridine, vinyl norbornene, dicyclopentadiene, and 1,4-hexadiene; α-olefins, for example, ethylene and propylene; ethylenically unsaturated amide monomers, for example, (meth)acryl amide; isocyanate-based monomers, for example, methylenediphenyldiisocyanate and toluenediisocyanate; and polyol-based monomers, for example, glycerin, ethylene glycol, and propylene glycol. Any monomers available in the art may be used.

In some embodiments, the first nanoparticles may be prepared by any suitable methods, not limited to, for example, emulsification polymerization or solution polymerization. Reaction conditions in these methods may be appropriately controlled by one of ordinary skill in the art.

In any of the binder composition dispersions for a secondary battery described herein, the first polymer binder particles may be the same materials as the first polymer binder particles in the binder compositions for a secondary battery according to the above-described embodiments.

In some embodiments, the first polymer binder particles may include, but not limited to, at least one selected from the group consisting of styrene-butadiene rubber, acrylated styrene-butadiene rubber, acrylonitrile-butadiene rubber, acrylonitrile-butadiene-styrene rubber, acryl rubber, butyl rubber, fluorine rubber, polytetrafluoroethylene, polyethylene, polypropylene, an ethylene-propylene copolymer, polyethylene oxide, polyvinylpyrolidone, polyepichlorohydrin, polyphosphazene, polyacrylate, polyacrylonitrile, polystyrene, ethylene propylene diene copolymer, polyvinylpyridine, chlorosulfonated polyethylene, latex, polyester resin, acryl resin, phenolic resin, epoxy resin, polyvinylalcohol, carboxymethyl cellulose, hydroxypropylmethyl cellulose, hydroxypropyl cellulose, and diacetylcellulose. Any suitable polymer binder particles known in the art may be used.

In some embodiments, the first polymer binder particles may be aqueous polymer binder particles or nonaqueous polymer binder particles. The aqueous polymer binder particles may refer to water-dispersible (waterborne) polymer binder particles able to be easily dispersed or dissolved in water.

Non-limiting examples of monomers used to prepare the first polymer binder particles include ethylenically unsaturated carboxylic acid alkyl esters, for example, methyl methacrylate, butylmethacrylate, ethylmethacrylate, and 2-ethylhexylmethacrylate; cyano group-containing ethylenically unsaturated monomers, for example, acrylonitrile, methacrylonitrile, α-chloroacrylonitrile, and α-cyanoethyl acrylonitrile; conjugated diene monomers, for example, 1,3-butadiene, isoprene, 2,3-dimethyl-1,3-butadiene, 2-ethyl-1,3-butadiene, 1,3-pentadiene, and chloroprene; ethylenically unsaturated carboxylic acids, for example, acrylic acid, methacrylic acid, maleic acid, fumaric acid, and citaconic acid, and salts thereof; aromatic vinyl monomers, for example, styrene, alkylstyrene, and vinylnaphthalene; fluoroalkylvinylethers, for example, fluoroethylvinylether; non-conjugated diene monomers, for example, vinylpyridine, vinyl norbornene, dicyclopentadiene, and 1,4-hexadiene; α-olefins, for example, ethylene and propylene; and ethylenically unsaturated amide monomers, for example, methacryl (meth)acryl amide. Any monomers available in the art may be used.

The first polymer binder particles may be prepared by any suitable methods, not limited to, for example, emulsion polymerization or solution polymerization. Reaction conditions in these methods may be appropriately controlled by one of ordinary skill in the art.

In some embodiments, the binder composition for a secondary battery may include first nanoparticles having an average particle diameter of about 100 nm or less; and a first polymer binder having a glass transition temperature of about 20° C. or less, wherein the first nanoparticles may be inert with respect to at least one of a protonic acid and a Lewis acid generated from reaction between a lithium salt in an electrolyte of a lithium battery and moisture remaining in an organic solvent of the electrolyte. The first nanoparticles being insert to a protonic acid and/or a Lewis acid refer to that the first nanoparticles may not be deteriorated by the protonic acid and/or generated from the reaction between the lithium salt and the moisture residue of the electrolyte in a lithium battery, or a degree of deterioration thereof is negligible. Due to the first nanoparticles being inert or less reactive to the protonic acid and/or Lewis acid, the lithium battery may have improved lifetime characteristics without deterioration. For example, due to suppression of a side reaction of the binder composition including the first nanoparticles, i.e., decomposition by reaction with a hydrofluoric acid (HF), the lithium battery may achieve good lifetime characteristics.

In the following reaction schemes, $H^+XF_n^-$ denotes a protonic acid, and $XF_{n-1}$ (sol) denotes a Lewis acid. The protonic acid and/or Lewis acid may be hydrofluoric acid (HF).

$$LiXF_n + H_2O \leftrightarrows LiOH + H^+XF_n^- (X=B,P,As; n=4,6)$$

$$LiXF_{n(sol)} \leftrightarrows LiF_{(s)} + XF_{n-1(sol)}$$

$$XF_{n-1} + H_2O \rightarrow H^+(XF_{n-1}OH)^-$$

In some embodiments, the first nanoparticles of the binder composition may be inorganic particles.

The first nanoparticles may be made from a metal fluoride, a metal nitride, a metal carbide or a metal oxide. The metal fluoride may be a fluoride of a metal/metalloid that is an element of Group 2 to Group 15 of the periodic table of elements. For example, the metal fluoride may be, but not limited to, magnesium fluoride ($MgF_2$). Any metal fluorides available in the art that are inert with respect to hydrofluoric acid (HF) may be used. The metal nitride may be a nitride of a metal/metalloid that is an element of Group 2 to Group 15 of the periodic table of elements. For example, the metal nitride may be, but not limited to, titanium nitride (TiN). Any metal nitrides available in the art that are inert with respect to hydrofluoric acid (HF) may be used. The metal carbide may be a carbide of a metal/metalloid that is an element of Group 2 to Group 15 of the periodic table of elements. For example, the metal carbide may be, but not limited to, tungsten carbide (WC). Any metal carbides available in the art that are inert with respect to hydrofluoric acid (HF) may be used.

For example, the first nanoparticles may be a metal oxide. An example of the metal oxide may be, but not limited to, α-alumina. Any metal oxides available in the art that are inert with respect to hydrofluoric acid (HF) may be used.

In some embodiments, the first nanoparticles may be inorganic particles. Non-limiting examples of the inorganic particles are α-alumina particles and magnesium fluoride ($MgF_2$) particles. Any inorganic particles available in the art that are inert with respect to hydrofluoric acid (HF) may be used.

In any of the binder compositions for a secondary battery described herein, the first nanoparticles may not change color when dipped in an organic electrolyte solution including a lithium salt at about 70° C. for about 72 hours. The lithium battery including first nanoparticles that are colored into brown when dipped in an organic electrolyte solution including a lithium salt at about 70° C. for about 72 hours may have poor lifetime characteristics.

When the binder composition for a secondary battery described herein includes the first nanoparticles that are inert with respect to at least one of a protonic acid and a Lewis acid, a coupling agent of the binder composition may not include a metalloid element. For example, the coupling agent may not include silicon (Si).

In some embodiments, the binder composition for a secondary battery may include the first nanoparticles having an average particle diameter of about 100 nm or less, and a first polymer binder having a glass transition temperature of about 20° C. or less, wherein the binder composition may have a breaking strength of about 25 Kg/cm², as measured in a binder film impregnated with electrolyte solution. A binder film formed from the binder composition for a secondary battery, including the first nanoparticles having an average particle diameter of about 100 nm or less and the first polymer binder having a glass transition temperature of about 20° C. or less, may have a breaking strength of about 25 Kg/cm$^2$ or greater, when combined with electrolyte solution, which is strong enough to absorb and/or suppress a volumetric change of an anode active material during charging and discharging, and accordingly, a lithium battery including the binder composition may have improved cycle characteristics. The binder composition for a secondary battery may also maintain a high elastic modulus at a high temperature of about 60° C. or greater due to the first polymer binder including a functional group able to bind with the first nanoparticles. In the binder composition for a secondary battery, the first polymer binder may not have any particular shape and may serve as a matrix.

The binder composition for a secondary battery described herein may have a breaking strength of about 30 kg/cm$^2$ or greater, as measured in a binder film impregnated with electrolyte solution. For example, the binder composition for a secondary battery may have a breaking strength of about 30 kg/cm$^2$ or greater, as measured in a binder film at a tensile speed of about 100 cm/min after impregnating the binder film with a polar nonaqueous solvent at about 70° C. for about 72 hours and wiping an electrolyte solvent from the binder film. For example, the binder composition for a secondary battery may have a breaking strength of about 35 kg/cm$^2$ or greater, and in some embodiments, about 40 kg/cm$^2$ or greater, and in some other embodiments, about 45 kg/cm$^2$ or greater, and in still other embodiments, about 50 kg/cm$^2$ or greater, and in yet other embodiments, about 55 kg/cm$^2$ or greater, as measured in a binder film impregnated with electrolyte solution. For example, the binder composition for a secondary battery may have a breaking strength of about 25 kg/cm$^2$ to about 200 kg/cm$^2$, and in some embodiments, about 30 kg/cm$^2$ to about 150 kg/cm$^2$, and in some other embodiments, about 35 kg/cm$^2$ to about 150 kg/cm$^2$, and in still other embodiments, about 40 kg/cm$^2$ to about 100 kg/cm$^2$, as measured in a binder film impregnated with electrolyte solution. When the binder film impregnated with electrolyte solution has a breaking strength of less than 25 kg/cm$^2$, it may be difficult to suppress expansion of the electrode. On the other hand, when the breaking strength of the binder film combined with electrolyte solution is above these ranges, the electrode may be too hard to wind and may crack during the manufacture of the electrode.

In some other embodiments, the binder composition for a secondary battery may include a filler dispersed within an elastic polymer matrix, wherein the filler may include first nanoparticles having an average particle diameter of about 100 nm or less and a first polymer binder having a glass transition temperature of about 20° C. or less. In other words, the binder composition for a secondary battery may include a filler including the first nanoparticles, and an elastic matrix including the first polymer binder, wherein the filler may be dispersed in the elastic matrix of the first polymer binder.

In some embodiments, the binder composition for a secondary battery, including first nanoparticles having an average particle diameter of about 100 nm or less and a first polymer binder having a glass transition temperature of about 20° C. or less, may have both strong intensity and flexibility, and thus may absorb and/or suppress a volumetric change of an anode active material during charging and discharging. Thus, a lithium battery including the binder composition may have improved cycle characteristics. In some embodiments, when a filler including the first nanoparticles is disposed in an elastic polymer matrix of the first polymer binder in the binder composition for a secondary battery, the binder composition may maintain a high elastic modulus at a high temperature of about 60° C. or greater. The first polymer binder in the binder composition for a secondary battery may be non-shaped and may serve as a matrix.

In some embodiments, the first nanoparticles in the binder compositions for a secondary battery may be chemically bound with the first polymer binder.

In some embodiments, an anode includes an anode active material and any of the binder compositions for a secondary battery described herein.

For example, the anode may include a binder composition for a secondary battery that includes the first nanoparticles dispersed in the first polymer binder. In the binder composition of the anode, the first polymer binder may serve as a matrix, with the first nanoparticles dispersed in the matrix. The binder composition for a secondary battery may be obtained from a binder composition dispersion during manufacture of the anode, i.e., as a result of solvent removal from an anode active material slurry mixed with the binder composition dispersion.

For example, the anode may be manufactured by molding an anode active material composition including an anode active material and any of the binder composition dispersions described herein into a desired shape, or coating the anode active material composition on a current collector such as a copper foil, or the like.

For example, an anode active material, a conducting agent, a binder composition dispersion for a secondary battery as described above, and a solvent may be mixed to prepare an anode active material composition. The anode active material composition may be directly coated on a metallic current collector to prepare an anode plate. In some embodiments, the anode active material composition may be cast on a separate support to form an anode active material film, which may then be separated from the support and laminated on a metallic current collector to prepare an anode plate. The anode may have any of a variety of forms, not limited to the above-described forms.

In some embodiments, the anode active material may be a noncarbonaceous material. For example, the anode active material may include at least one selected from the group consisting of a metal that is alloyable with lithium, an alloy of the metal alloyable with lithium, an oxide of the metal alloyable with lithium, and any combinations thereof.

Examples of the metal alloyable with lithium are Si, Sn, Al, Ge, Pb, Bi, Sb, a Si—$Y^1$ alloy (where $Y^1$ is an alkali metal, an alkali earth metal, an element of Group 13 to Group 16 of the periodic table of elements, a transition metal, a rare earth element, or a combination thereof except for Si), and a Sn—$Y^1$ alloy (where $Y^1$ is an alkali metal, an alkali earth metal, a Group 13 to Group 16 element, a transition metal, a rare earth element, or a combination thereof except for Sn). $Y^1$ may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or any combinations thereof.

Non-limiting examples of the transition metal oxide are a lithium titanium oxide, a vanadium oxide, and a lithium vanadium oxide.

Non-limiting examples of the non-transition metal oxide are $SnO_2$ and $SiO_x$ (where $0<x<2$).

For example, the anode active material may be at least one selected from the group consisting of Si, Sn, Pb, Ge, Al, $SiO_x$ (where $0<x\leq 2$), $SnO_y$ (where $0<y\leq 2$), $Li_4Ti_5O_{12}$, $TiO_2$, $LiTiO_3$, and $Li_2Ti_3O_7$, but is not limited thereto. For example, any non-carbonaceous anode active materials available in the art may be used.

For example, the anode active material may be a composite of such a non-carbonaceous anode active material as described above and a carbonaceous material. Alternatively, the anode active material may be a mixture of a carbonaceous anode active material and such a non-carbonaceous material as described above.

Examples of the carbonaceous material are crystalline carbon, amorphous carbon, and mixtures thereof. Examples of the crystalline carbon are graphite, such as natural graphite or artificial graphite that are in amorphous, plate, flake, spherical or fibrous form. Examples of the amorphous carbon are soft carbon (carbon sintered at low temperatures), hard carbon, meso-phase pitch carbides, sintered corks, and the like.

Non-limiting examples of the conducting agent are acetylene black, ketjen black, natural graphite, artificial graphite, carbon black, carbon fiber, and metal powder and metal fiber of, for example, copper, nickel, aluminum or silver. In some embodiments at least one conducting material such as polyphenylene derivatives may be used in combination. Any conducting agent available in the art may be used. The above-described crystalline carbonaceous materials may be further added as the conducting agent.

In some embodiments, the anode active material composition may further include a conventional binder used in the art, in addition to the binder composition for a secondary battery according to any of the above-described embodiments. Examples of the conventional binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but are not limited thereto. Any material available as a binding agent in the art may be used.

Non-limiting examples of the solvent are N-methyl-pyrrolidone, acetone, and water. Any material available as a solvent in the art may be used.

The amounts of the anode active material, the conducting agent, the binder, and the solvent may be those levels generally used in lithium batteries. At least one of the conducting agent, the binder and the solvent may not be used depending on the use and the structure of the lithium battery.

In some embodiments, a lithium battery includes any of the anodes according to the above-described embodiments. The lithium battery may be manufactured in the following manner.

First, an anode may be prepared according to the above-described anode manufacturing method.

Next, a cathode active material, a conducting agent, a binder, and a solvent may be mixed to prepare a cathode active material composition. The cathode active material composition may be directly coated on a metallic current collector and dried to prepare a cathode plate. In some embodiments, the cathode active material composition may be cast on a separate support to form a cathode active material film, which may then be separated from the support and laminated on a metallic current collector to prepare a cathode plate.

The cathode active material may include at least one selected from the group consisting of lithium cobalt oxide, lithium nickel cobalt manganese oxide, lithium nickel cobalt aluminum oxide, lithium iron phosphorous oxide, and lithium manganese oxide, but is not limited thereto. Any cathode active materials available in the art may be used.

For example, the cathode active material may be a compound represented by one of the following formulae: $Li_aA_{1-b}B^1{}_bD^1{}_2$ (where $0.90 \leq a \leq 1.8$, and $0 \leq b \leq 0.5$); $Li_aE_{1-b}B^1{}_bO_{2-c}D^1{}_c$ (where $0.90 \leq a \leq 1.8$, $0 \leq b \leq 0.5$, and $0 \leq c \leq 0.05$); $LiE_{2-b}B^1{}_bO_{4-c}D^1{}_c$ (where $0 \leq b \leq 0.5$, and $0 \leq c \leq 0.05$); $Li_aNi_{1-b-c}Co_bB^1{}_cD^1{}_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB^1{}_cO_{2-\alpha}F^1{}_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB^1{}_cO_{2-\alpha}F^1{}_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cD^1{}_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB^1{}_cO_{2-\alpha}F^1{}_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cO_{2-\alpha}F^1{}_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

In some embodiments, compounds listed above as cathode active materials may have a surface coating layer (hereinafter, "coating layer"). Alternatively, a combination of the compound without having a coating layer and the compound having a coating layer, with the compounds being selected from the compounds listed above, may be used. The coating layer may include at least one compound of a coating element selected from the group consisting of oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material when a compound of the coating element is used. For example, the coating layer may be formed using a spray coating method, a dipping method, or the like. A detailed description thereof is omitted.

For example, the cathode active material may be $LiNiO_2$, $LiCoO_2$, $LiMn_xO_{2x}$ (x=1, 2), $LiNi_{1-x}Mn_xO_2(0<x<1)$, $LiNi_{1-x-y}Co_xMn_yO_2$ (where $0 \leq x \leq 0.5$, $0 \leq y \leq 0.5$), $LiFeO_2$, $V_2O_5$, TiS, or MoS.

The conducting agent, the binder and the solvent used for the cathode active material composition may be the same as those used for the anode active material composition. Alternatively, a plasticizer may be further added to the cathode active material composition and/or the anode active material composition to form pores in the electrode plates.

The amount of the cathode electrode active material, the conducting agent, the binder, and the solvent are those levels that are generally used to the manufacture of a lithium battery. At least one of the conducting agent, the binder and the solvent may not be used depending on the use and the structure of the lithium battery.

Next, a separator to be disposed between the cathode and the anode is prepared. The separator may be any separator that is commonly used for lithium batteries. The separator may have low resistance to migration of ions in an electrolyte and have an excellent electrolyte-retaining ability. Examples of the separator include glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may be any material that is commonly used as a binder for electrode plates. Examples of the polymer resin include but not limited to a vinylidenefluoride/hexafluoropropylene copolymer, polyvinylidene fluoride (PVDF), polyacrylonitrile, polymethylmethacrylate and a mixture thereof.

Next, an electrolyte may be prepared.

For example, the electrolyte may be an organic electrolyte solution. Alternately, the electrolyte may be in a solid phase. Non-limiting examples of the electrolyte include lithium oxide and lithium oxynitride. Any material available as a solid electrolyte in the art may be used. The solid electrolyte may be formed on the anode by, for example, sputtering.

In some embodiments, an organic electrolyte solution may be prepared as follows. The organic electrolyte solution may be prepared by dissolving a lithium salt in an organic solvent.

The organic solvent may be any solvent available as an organic solvent in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any material available as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a combination) thereof.

FIG. 1 is a schematic view of a lithium battery. Referring to FIG. 1, a lithium battery 1 includes a cathode 3, an anode 2, and a separator 4. The cathode 3, the anode 2 and the separator 4 are wound or folded, and then sealed in a battery case 5. Then, the battery case 5 is filled with an organic electrolyte solution and sealed with a cap assembly 6, thereby completing the manufacturing process of the lithium battery 1. The battery case 5 may be a cylindrical type, a rectangular type, or a thin-film type. For example, the lithium battery may be a thin-film type battery. The lithium battery may be a lithium ion battery.

The separator may be disposed between the cathode and the anode to form a battery assembly. In some embodiments, the battery assembly may be stacked in a bi-cell structure and impregnated with the electrolyte solution. The resultant is put into a pouch and hermetically sealed, thereby completing the manufacture of a lithium ion polymer battery.

In some other embodiments, a plurality of battery assemblies may be stacked to form a battery pack, which may be used in any suitable device that operate at high temperatures and require high output, for example, in a laptop computer, a smart phone, an electric vehicle, and the like.

The lithium battery may have increased charge/discharge rate, electric capacity, and lifetime characteristics, and thus may be applicable in an electric vehicle (EV), for example, in a hybrid vehicle such as plug-in hybrid electric vehicle (PHEV).

One or more embodiments of the present invention will be described in detail with reference to the following examples. However, these examples are not intended to limit the scope of the one or more embodiments of the present invention.

Preparation of First Polymer Binder Particle Emulsion

Preparation Example 001

After charging a flask reactor equipped with a condenser, a thermometer, a monomer emulsion inlet, a nitrogen gas inlet, and a stirrer with nitrogen gas, 60 parts by weight of distilled water and 1.5 parts by weight of sodium dodecylbenzene sulfonate were added to the flask reactor, and the temperature of the flask reactor was increased to about 70° C. Subsequently, 2 parts by weight of styrene was added to the flask reactor and stirred for about 5 minutes, followed by adding 10 parts by weight of a 5% aqueous solution of ammonium persulfate thereto to initiate the reaction. After 1 hour, a monomer emulsion including 49.5 parts by weight of 2-ethylhexyl acrylate, 43 parts by weight of styrene, 2 parts by weight of acrylic acid, 2 parts by weight of methacrylic acid, 3 parts by weight of hydroxyethyl acrylate, 0.5 parts by weight of ethylene dimethacrylate, 0.5 parts by weight of sodium dodecylbenzene sulfonate, and 40 parts by weight of distilled water was added dropwise in a dropwise fashion to the flask reactor for about 3 hours, in parallel with a dropwise addition of 6 parts by weight of a 5% aqueous solution of ammonium persulfate over about 3 hours. After completion of the dropwise addition of the monomer emulsion, reaction was performed for about 2 more hours until a polymerization conversion rate reached about 98.2%. Subsequently, the resulting reaction solution was cooled down to about 20° C. and then subjected to reduced pressure to remove the monomer residue, followed by pH adjustment to about 8.0 with a 5 wt % aqueous solution of lithium hydroxide and then solid content adjustment to about 40% to obtain an acrylic acid ester-based polymer emulsion. Polymer binder particles dispersed in the acrylic acid ester-based polymer emulsion had an average particle diameter of about 120 nm and a glass transition temperature (Tg) of about −10° C.

Preparation Example 002

After charging a flask reactor equipped with a condenser, a thermometer, a monomer emulsion inlet, a nitrogen gas inlet, and a stirrer with nitrogen gas, 60 parts by weight of distilled water and 1.5 parts by weight of sodium dodecylbenzene sulfonate were added to the flask reactor, and the temperature of the flask reactor was increased to about 70° C. Subsequently, 2 parts by weight of styrene was added to the flask reactor and stirred for about 5 minutes, followed by adding 10 parts by weight of a 5% aqueous solution of ammonium persulfate thereto to start the reaction. After 1 hour, a monomer emulsion including about 36 parts by weight of 2-ethylhexyl acrylate, about 59 parts by weight of isobornyl acrylate, about 1.5 parts by weight of acrylic acid, about 2 parts by weight of hydroxyethyl acrylate, about 1 part by weight of methacrylic acid, about 0.5 parts by weight of ethylenedimethacrylate, about 0.5 parts by weight of sodium dodecylbenzene sulfonate, and about 40 parts by weight of distilled water was added in a dropwise fashion to the flask reactor for about 3 hours, in parallel with a dropwise addition of 6 parts by weight of a 5% aqueous solution of ammonium persulfate over about 3 hours. After completion of the dropwise addition of the monomer emulsion, further reaction was performed for about 2 more hours until the polymerization conversion rate reached about 98.5%. Subsequently, the resulting reaction solution was cooled down to about 20° C. and then subjected to reduced pressure to remove the monomer residue, followed by a pH adjustment to about 8.0 with a 5 wt % aqueous solution of lithium hydroxide and a solid content adjustment to about 40% to obtain an acrylic acid ester-based polymer emulsion. Polymer binder particles dispersed in the acrylic acid ester-based polymer emulsion had an average particle diameter of about 110 nm and a glass transition temperature (Tg) of about 17° C.

Preparation of First Nanoparticle Emulsion

Preparation Example 003

After charging a flask reactor equipped with a condenser, a thermometer, a monomer emulsion inlet, a nitrogen gas inlet, and a stirrer with nitrogen gas, 500 parts by weight of distilled water and 3 parts by weight of sodium dodecylbenzene sulfonate were added to the flask reactor, and the temperature of the flask reactor was increased to about 80° C. Subsequently, 2 parts by weight of methylmethacrylate was added to the flask reactor and stirred for about 5 minutes, followed by adding 20 parts by weight of a 5% aqueous solution of ammonium persulfate thereto to start the reaction. After 1 hour, a monomer emulsion including 95 parts by weight of methylmethacrylate, 2 parts by weight of acrylic acid, about 2 parts by weight of methacrylic acid, about 1 part by weight of ethylene dimethacrylate, 0.5 parts by weight of sodium dodecylbenzene sulfonate, and 40 parts by weight of distilled water was added in a dropwise fashion to the flask reactor for about 3 hours, in parallel with a dropwise addition of 10 parts by weight of a 5% aqueous solution of ammonium persulfate over about 3 hours. After completion of the dropwise addition of the monomer emulsion, the reaction was performed for about 2 more hours until a polymerization conversion rate reached about 98.9%. Subsequently, the resulting reaction solution was cooled down to about 20° C. and then subjected to reduced pressure to remove the monomer residue, followed by a pH adjustment to about 8.0 with a 5 wt % aqueous solution of lithium hydroxide and solid content adjustment to about 40% to obtain an emulsion of polymer particles having a Tg of about 100° C. The polymer particles dispersed in the emulsion had an average particle diameter of about 70 nm.

Comparative Preparation Example 001

After charging a flask reactor equipped with a condenser, a thermometer, a monomer emulsion inlet, a nitrogen gas inlet, and a stirrer with nitrogen gas, 60 parts by weight of distilled water and 1.5 parts by weight of sodium dodecylbenzene sulfonate were added to the flask reactor, and the temperature of the flask reactor was increased to about 70° C. Subsequently, 2 parts by weight of styrene was added to the flask reactor and stirred for about 5 minutes, followed by adding 10 parts by weight of a 5% aqueous solution of ammonium persulfate thereto to start the reaction. After 1 hour, a monomer emulsion including 70 parts by weight of styrene, 25 parts by weight of methylmethacrylate, 2 parts by weight of acrylic acid, 2 parts by weight of methacrylic acid, 1 part by weight of ethylene dimethacrylate, 0.5 parts by weight of sodium dodecylbenzene sulfonate, and 40 parts by weight of distilled water was added in a dropwise fashion to the flask reactor for about 3 hours, simultaneously with dropwise addition of 6 parts by weight of a 5% aqueous solution of ammonium persulfate over about 3 hours. After completion of the dropwise addition of the monomer emulsion, the reaction was stirred for about 2 more hours until a polymerization conversion rate reached about 98.5%. Subsequently, the resulting reaction solution was cooled to about 20° C. and then subjected to a reduced pressure to remove the monomer residue, followed by a pH adjustment to about 8.0 with a 5 wt % aqueous solution of lithium hydroxide and a solid content adjustment to about 40% to obtain an emulsion of polymer particles having a Tg of about 100° C. The polymer particles dispersed in the emulsion had an average particle diameter of about 120 nm.

Preparation of Binder Composition Dispersion for Secondary Battery

Example 001

About 30 parts by weight (dry weight basis) of the polymer emulsion of Preparation Example 3 (15 wt % solid content) having an average particle diameter of about 70 nm and about 4 parts by weight (dry weight basis) of a carbodiimide coupling agent (Carbodilite V-02-L2, available from Nisshinbo Chemical Inc., Japan) were added to about 100 parts by weight (dry weight basis) of a polymer emulsion (BM451B, available from Nippon Zeon Co., Ltd., Tokyo, Japan, 40 wt % solid content) having an average particle diameter of about 120 nm, and then stirred for about 10 minutes to prepare a binder composition dispersion (about 29 wt % solid content) for a secondary battery.

Example 002

About 34.3 parts by weight (dry weight basis) of a polymer emulsion (SUPERFLEX 130, available from Dai-ichi Kogyo Seiyaku Co., Ltd., Tokyo, Japan, 35 wt % solid content) having an average particle diameter of about 30 nm was added to about 100 parts by weight (dry weight basis) of a polymer emulsion (BM451B, available from Nippon Zeon Co., Ltd., Japan, 40 wt % solid content) having an average particle diameter of about 120 nm, and then stirred for about 10 minutes to prepare a binder composition dispersion (about 38.7 wt % solid content) for a secondary battery.

Example 003

About 34.3 parts by weight (dry weight basis) of a polymer emulsion (SUPERFLEX 130, available from Dai-ichi Kogyo Seiyaku Co., Ltd., Tokyo, Japan, 35 wt % solid content) having an average particle diameter of about 30 nm and about 4 parts by weight (dry weight basis) of a carbodiimide coupling agent (Carbodilite V-02-L2, available from Nisshinbo Chemical Inc., Japan, about 40% effective component) were added to about 100 parts by weight (dry weight basis) of a polymer emulsion (BM451B, available from Nippon Zeon Co., Ltd., 40 wt % solid content) having an average particle diameter of about 120 nm, and then stirred for about 10 minutes to prepare a binder composition dispersion (about 38.7 wt % solid content) for a secondary battery.

Example 004

About 40 parts by weight (dry weight basis) of a polymer emulsion (EPOSTAR MX030W, available from Nippon Shokubai, Tokyo, Japan, 10 wt % solid content) having an average particle diameter of about 40 nm and about 0.4 parts by weight of γ-glycidoxypropyltrimethoxysilane as a silane coupling agent were added to about 100 parts by weight (dry weight basis) of a polymer emulsion (BM451B, available from Nippon Zeon Co., Ltd., Tokyo, Japan, 40 wt % solid content) having an average particle diameter of about 120 nm, and then stirred for about 10 minutes to prepare a binder composition dispersion (about 23.7 wt % solid content) for a secondary battery.

Example 005

About 20 parts by weight (dry weight basis) of a polymer emulsion (EPOSTAR MX030W, available from Nippon Shokubai, Tokyo, Japan, 10 wt % solid content) having an average particle diameter of about 40 nm and about 0.4 parts by weight of γ-glycidoxypropyltrimethoxysilane as a silane coupling agent were added to about 100 parts by weight (dry weight basis) of the polymer emulsion of Preparation Example 001 (40 wt % solid content) having an average particle diameter of about 120 nm, and then stirred for about 10 minutes to prepare a binder composition dispersion (about 26.7 wt % solid content) for a secondary battery.

Example 006

About 153 parts by weight (dry weight basis) of a polymer emulsion (SUPERFLEX 130, available from Dai-ichi Kogyo Seiyaku Co., Ltd., Tokyo, Japan, 35 wt % solid content) having an average particle diameter of about 30 nm and about 4 parts by weight (dry weight basis) of a carbodiimide coupling agent (Carbodilite V-02-L2, available from Nisshinbo Chemical Inc., Tokyo, Japan, about 40% effective component) were added to about 100 parts by weight (dry weight basis) of the polymer emulsion of Preparation Example 002 (40 wt % solid content) having an average particle diameter of about 110 nm, and then stirred for about 10 minutes to prepare a binder composition dispersion (about 39.2 wt % solid content) for a secondary battery.

Comparative Example 001

Binder Composition Dispersion not Including the First Nanoparticles Having a Tg of about 60° C. or Greater A binder composition dispersion for a secondary battery was prepared from a polymer emulsion (BM451B, available from Nippon Zeon Co., Ltd., Tokyo, Japan, 40 wt % solid content) having an average particle diameter of about 120 nm.

Comparative Example 002

A binder composition dispersion for a secondary battery was manufactured following the same procedures described in Example 001, except that the emulsion of polymer particles prepared in Comparative Preparation Example 001, instead of the emulsion of polymer particles prepared in Preparation Example 003, was used.

Manufacture of Anode and Lithium Battery

Example 007

A Si—Fe alloy active material (CV3, available from 3M, Minnesota, USA) having an average particle diameter (d50) of about 3 μm, artificial graphite (MAG, available from Hitachi Chemical Co., Ltd., Tokyo, Japan), and carboxymethylcellulose (CMC) were mixed in pure water, and then the binder composition dispersion of Example 1 for a secondary battery was added thereto to prepare an active material slurry with a weight ratio of Si—Fe alloy:graphite:CMC:binder (solid content) of about 20:77:1:2.

The active material slurry was coated on a 10 μm-thick copper (Cu) foil to a thickness of about 90 μm, dried at about 110° C. for about 30 minutes, and then roll-pressed to a thickness of about 70 μm to form an anode plate, which was then used to form a coin cell (CR2016) having a diameter of about 32 mm.

In manufacturing the coin cell, metal lithium as a counter electrode, a polyethylene separator (Star® 20) having a thickness of about 20 μm, and an electrolyte solution of 1.15M $LiPF_6$ dissolved in a mixed solvent of ethylene carbonate (EC), ethylmethyl carbonate (EMC), and diethylcarbonate (DEC) in a 3:3:4 volume ratio were used.

Examples 008 to 012

A cathode and a lithium battery were manufactured following the same procedures described in Example 007, except that the binder composition dispersions of Examples 002 to 006 were used, respectively.

Comparative Examples 003 and 004

A cathode and a lithium battery were manufactured following the same procedures described in Example 007, except that the binder composition dispersions of comparative Examples 001 and 002 were used, respectively.

Evaluation Example 001

High-Temperature Elastic Modulus Measurement

The binder composition dispersions of Examples 001 to 006 and Comparative Examples 001 and 002 were each coated on a substrate, and then dried at room temperature for about 24 hours to remove the solvent and form a film, which was then removed from the substrate for use as a binder composition sample. The binder composition sample was loaded into a Tensile Tester (available from Instron) to measure change in strain with respect to stress, according to the ASTM Standard. An elastic modulus (E) at about 60° C. was calculated from the slope of a stress-strain curve of the binder composition sample. In Table 001, MPa denotes mega pascal.

TABLE 001

| Example | Elastic modulus [MPa] |
| --- | --- |
| Example 001 | 100 |
| Example 002 | 120 |
| Example 003 | 110 |
| Example 004 | 90 |
| Example 005 | 55 |
| Example 006 | 85 |
| Comparative Example 001 | 8 |
| Comparative Example 002 | 40 |

Referring to Table 001, the binder composition dispersions of Examples 001 to 006 for secondary batteries were found to have remarkably increased elastic moduli, compared to the binder composition dispersions of Comparative Examples 001 and 002.

Evaluation Example 002

Measurement of Breaking Strength of Electrolyte-Impregnated Binder Film

The binder composition dispersions of Examples 001 to 006 and Comparative Examples 001 to 002 for secondary batteries were each put into a Teflon petri dish having a diameter of about 12 cm and then dried at room temperature for about 2 days to prepare a binder film having a thickness of about 0.6 mm. The binder film was dried further in a 70° C.-vacuum drier for about 10 hours to completely remove moisture, and then cut into a binder sample having a length of about 5 cm and a width of about 5 mm for breaking strength measurement.

The binder composition sample was dipped in a mixed solvent for electrolyte of ethylmethyl carbonate (EC), ethylmethylcarbonate (EMC) and diethyl carbonate (DEC) in a volume ratio of about 3:5:2 at about 70° C. for about 72 hours. After wiping the mixed solvent for electrolyte from the binder sample, breaking strength of the binder sample was measured using a Tensile Tester at a tensile speed of about 100 cm/min.

The breaking strengths of four electrolyte-impregnated binder samples for each of Examples 001 to 006 and Comparative Examples 001 and 002 were measured to calculate a breaking strength according to Equation 001 below.

$$\text{Breaking Strength of binder sample} = \text{Most strong breaking strength of binder samples} \times 0.5 + \text{Second most strong breaking strength of binder composition samples} \times 0.3 + \text{Third most strong breaking strength of binder composition samples} \times 0.1 + \text{Weakest breaking strength of binder composition samples} \times 0.1$$ (Equation 001)

The results are shown in Table 002 below.

TABLE 002

| Example | Breaking strength [kg/cm$^2$] |
| --- | --- |
| Example 001 | 90 |
| Example 002 | 100 |
| Example 003 | 120 |
| Example 004 | 80 |
| Example 005 | 35 |
| Example 006 | 40 |
| Comparative Example 001 | 25 |
| Comparative Example 002 | 27 |

Referring to Table 002, the binder compositions (binder films) obtained from the binder composition dispersions of Examples 001 to 006 for secondary batteries were found to have remarkably increased breaking strengths of about 30 kg/cm$^2$ or greater when combined with electrolyte, compared to those of the binder compositions obtained from the binder composition dispersions of Comparative Examples 001 and 002.

Evaluation Example 003

Evaluation of Charge-Discharge Characteristics and Electrode Expansion Ratio

The coin cells manufactured in Examples 007 to 012 and Comparative Examples 003 and 004 were each charged with a constant current of 0.05 C rate at 25° C. to a voltage of about 0.01V (with respect to Li) and then with a constant voltage of about 0.01V to a current of about 0.02 C, followed by discharging with a constant current of 0.05 C to a voltage of about 1.5V (with respect to Li) (Formation Process)

Subsequently, each of the cells after the formation process was charged with a constant current of 0.2 C rate at about 25° C. to a voltage of about 0.01V (with respect to Li) and then with a constant voltage of about 0.01V to a current of 0.02 C, followed by discharging with a constant current of 0.2 C to a voltage of 1.5 V (with respect to Li) to evaluate an initial charge-discharge efficiency and performance of the cell.

After the evaluation of the initial capacity, each of the cells was charged with a constant current of 0.7 C rate at about 25° C. to a voltage of about 0.01V (with respect to Li) and then with a constant voltage of about 0.01V to a current of about 0.02 C, followed by discharging with a constant current of about 0.5 C to a voltage of about 1.5V (with respect to Li). This charge/discharge cycle was repeated 100 times.

Some of the results of the charge/discharge test are shown in Table 2 below. An electrode expansion ratio is defined by Equation 002 below.

After completion of the constant current/constant voltage charging at the 1st cycle, the cell was disassembled to measure the thicknesses of an anode of the cell. The thickness of the anode before use (bare anode), i.e., before the 1st cycle, was also measured. The electrode expansion ratio of each cell was calculated using Equation 002.

A capacity retention rate is defined by Equation 003 below.

$$\text{Electrode expansion ratio [\%]} = \left[\frac{\left(\begin{array}{c}\text{Thickness of anode after charging at }1^{st}\\ \text{cycle} - \text{Thickness of unused anode}\end{array}\right)}{\text{Thickness of unused anode(bare anode)}}\right] \times 100 \quad \text{(Equation 002)}$$

$$\text{Capacity retention rate [\%]} = [\text{Discharge capacity at }100^{th}\text{ cycle}/\text{Discharge capacity at }1^{st}\text{ cycle}] \times 100 \quad \text{(Equation 003)}$$

TABLE 003

| Example | Cycle lifetime [%] | Electrode expansion ratio [%] |
|---|---|---|
| Example 007 | 80 | 39 |
| Example 008 | 82 | 35 |
| Example 009 | 82 | 37 |
| Example 010 | 78 | 35 |
| Example 011 | 77 | 42 |
| Example 012 | 80 | 38 |
| Comparative Example 003 | 60 | 52 |
| Comparative Example 004 | 56 | 68 |

Referring to Table 003, the lithium batteries (coin cells) of Examples 007 to 012 were found to have decreased electrode expansion ratios and good lifetime characteristics, compared to those of the lithium batteries of Comparative Examples 003 and 004.

The lithium batteries of Examples 007 to 012 including the binder compositions with increased strengths or increased elastic modulli showed surprisingly improved lifetime characteristics due to the reduced electrode expansion ratios.

Preparation of First Polymer Binder Particle Emulsion

Preparation Example 101

Binder A

After charging a flask reactor equipped with a condenser, a thermometer, a monomer emulsion inlet, a nitrogen gas inlet, and a stirrer with nitrogen gas, 200 parts by weight of distilled water and 0.5 parts by weight of sodium dodecylbenzene sulfonate were added to the flask reactor, and the temperature of the mixture in the flash reactor was increased to about 60° C. Subsequently, a monomer mixture of about 1.0 part by weight of potassium persulfate, about 0.5 parts by weight of sodium bisulfite, about 0.2 parts by weight of α-methylstyrene dimer, about 0.2 parts by weight of t-dodecyl mercaptane, about 34 parts by weight of butadiene, about 30 parts by weight of styrene, about 17 parts by weight of methylmethacrylate, about 10 parts by weight of acrylonitrile, about 7 parts by weight of methacrylic acid, and about 2 parts by weight of acrylic acid were added at once to the flask reactor and the resultant mixture was heated to about 45° C. When the polymerization conversion rate reached about 40%, about 0.4 parts by weigh of t-dodecyl mercaptane was added thereto. When the polymerization conversion rate reached about 80%, the reaction temperature was increased to about 60° C., followed by further stiffing for about 6 hours until the polymerization conversion rate reached about 98%. Subsequently, the resulting reaction solution was cooled to about 20° C., and then subjected to a reduced pressure to remove the monomer residue, followed by a pH adjustment to about 7.0 with a 5 wt % aqueous solution of lithium hydroxide and a solid content adjustment to about 40% to obtain an acrylic acid ester-based polymer emulsion. Polymer binder particles dispersed in the emulsion had an average particle diameter of about 120 nm, a Tg of about 17° C., and a gel content of about 70%.

The polymer binder particles included a carboxyl group as a polar functional group.

Preparation Example 102

Binder A

After charging a flask reactor equipped with a condenser, a thermometer, a monomer emulsion inlet, a nitrogen gas inlet, and a stirrer with nitrogen gas, about 200 parts by weight of distilled water and about 0.5 parts by weight of sodium dodecylbenzene sulfonate were added to the flask reactor, and the temperature of the mixture in the flask reactor was increased to about 60° C. Subsequently, a monomer mixture of about 1.0 part by weight of potassium persulfate, about 0.5 parts by weight of sodium bisulfite, about 0.2 parts by weight of α-methylstyrene dimer, about 0.2 parts by weight of t-dodecyl mercaptan, about 34 parts by weight of butadiene, about 31 parts by weight of styrene, about 12 parts by weight of methylmethacrylate, about 15 parts by weight of acrylonitrile, about 2 parts by weight of methacrylic acid, about 2 parts by weight of acrylic acid, and about 4 parts by weight of hydroxyethyl methacrylate were added at once to the flask reactor at about 45° C., and then stirred. When the polymerization conversion rate reached about 40%, about 0.3 parts by weigh of t-dodecyl mercaptane was added thereto for further reaction. When the polymerization conversion rate reached about 80%, the reaction temperature was increased to about 60° C., followed by further stirring for about 6 hours until the polymerization conversion rate reached about 98%. Subsequently, the resulting reaction solution was cooled to about 20° C., and then subjected to reduced pressure to remove the monomer residue, followed by pH adjustment to about 7.0 with a 5 wt % aqueous solution of lithium hydroxide and a solid content adjustment to about 40% to obtain an acrylic acid ester-based polymer emulsion. Polymer binder particles dispersed in the emulsion had an average particle diameter of about 110 nm, a Tg of about 11° C., and a gel content of about 72%.

The polymer binder particles included a hydroxy group as a polar functional group.

Preparation of First Nanoparticle Emulsion

Preparation Example 103

After charging a flask reactor equipped with a condenser, a thermometer, a monomer emulsion inlet, a nitrogen gas inlet, and a stirrer with nitrogen gas, about 500 parts by weight of distilled water and about 3 parts by weight of sodium dodecylbenzene sulfonate were added to the flask reactor, and the temperature of the mixture in the flask reactor was increased to about 80° C. Subsequently, about 2 parts by weight of methylmethacrylate was added to the flask reactor and stirred for about 5 minutes, followed by adding about 20 parts by weight of a 5% aqueous solution of ammonium persulfate thereto to initiate reaction. After 1 hour, a monomer emulsion including about 93 parts by weight of methylmethacrylate, about 2 parts by weight of acrylic acid, about 4 parts by weight of methacrylic acid, about 1 part by weight of ethylene dimethacrylate, about 0.5 parts by weight of sodium dodecylbenzene sulfonate, and about 40 parts by weight of distilled water was added in a dropwise fashion to the flask reactor for about 3 hours, simultaneously with a dropwise addition of about 10 parts by weight of a 5% aqueous solution of ammonium persulfate over about 3 hours. After completion of the dropwise addition of the monomer emulsion, the reaction was further performed for about 1 hour until a polymerization conversion rate reached about 98.9%. Subsequently, the resulting reaction solution was cooled to about 20° C. and then subjected to a reduced pressure to remove the monomer residue, followed by a pH adjustment to about 8.0 with a 5 wt % aqueous solution of lithium hydroxide and a solid content adjustment to about 15% to obtain an emulsion of polymer particles having a Tg of about 100° C. The polymer particles dispersed in the emulsion had an average particle diameter of about 70 nm.

Preparation Example 104

After charging a flask reactor equipped with a condenser, a thermometer, a monomer emulsion inlet, a nitrogen gas inlet, and a stirrer with nitrogen gas, 500 parts by weight of distilled water and 3 parts by weight of sodium dodecylbenzene sulfonate were added to the flask reactor, and the temperature of the solution in the flask reactor was increased to about 80° C. Subsequently, about 2 parts by weight of methylmethacrylate was added to the flask reactor and stirred for about 5 minutes, followed by adding about 20 parts by weight of a 5% aqueous solution of ammonium persulfate thereto to start the reaction. After 1 hour, a monomer emulsion including about 99 parts by weight of methylmethacrylate, about 1 part by weight of ethylene dimethacrylate, about 2 parts by weight of sodium dodecylbenzene sulfonate, and about 40 parts by weight of distilled water was added in a dropwise fashion to the flask reactor for about 3 hours, in company with a dropwise addition of about 10 parts by weight of a 5% aqueous solution of ammonium persulfate over about 3 hours. After completion of the dropwise addition of the monomer emulsion, the reaction was stirred for about 1 hour until a polymerization conversion rate reached about 98.7%. Subsequently, the resulting reaction solution was cooled to about 20° C. and then subjected to a reduced pressure to remove the monomer residue, followed by a pH adjustment to about 8.0 with a 5 wt % aqueous solution of lithium hydroxide and a solid content adjustment to about 15% to obtain an emulsion of polymer particles having a Tg of about 108° C. The polymer particles dispersed in the emulsion had an average particle diameter of about 90 nm.

Comparative Preparation Example 101

After charging a flask reactor equipped with a condenser, a thermometer, a monomer emulsion inlet, a nitrogen gas inlet, and a stirrer with nitrogen gas, a monomer mixture of about 200 parts by weight of distilled water, about 0.5 parts by weight of sodium dodecylbenzene sulfonate, about 1.0 part by weight of potassium persulfate, about 0.5 parts by weight of sodium bisulfite, about 33 parts by weight of styrene, about 36 parts by weight of butadiene, about 30 parts by weight of methylmethacrylate, about 1 part by weight of itaconic acid, about 0.1 parts by weight of α-methyl styrene dimer, and about 0.2 parts by weight of t-dodecyl mercaptane was added simultaneously to the flask reactor at about 45° C. and then reacted for about 6 hours. When the polymerization conversion rate reached about 70%, a monomer mixture of about 66 parts by weight of styrene, about 9 parts by weight of butadiene, about 18 parts by weight of methylmethacrylate, about 4 parts by weight of butylacrylate, about 1 part by weight of acrylic acid, about 2 parts by weight of itaconic acid, about 0.2 parts by weight of α-methyl styrene dimer, and about 0.1 parts by weight of t-dodecyl mercaptane was continuously added thereto at 60° C. over about 7 hours, while stirring. After completion of the addition of the monomer mixture, the reaction was stirred at about 70° C. for about 6 hours until the polymerization conversion rate reached about 98% to 99%. Subsequently, the resulting reaction solution was cooled to about 20° C., and then subjected to reduced pressure to remove the monomer residue, followed by pH adjustment to about 7.0 with a 5 wt % aqueous solution of lithium hydroxide and a solid content adjustment to about 40% to obtain an emulsion of polymer particles. A copolymer of core forming monomers in the emulsion had a Tg of about 0° C., and a copolymer of shell forming monomers in the emulsion had a Tg of about 60° C.

Comparative Preparation Example 102

After charging a flask reactor equipped with a condenser, a thermometer, a monomer emulsion inlet, a nitrogen gas inlet, and a stirrer with nitrogen gas, about 1500 parts by weight of distilled water, about 25 parts by weight of sodium dodecylbenzene sulfonate, about 400 parts by weight of 1,3-butadiene, about 200 parts by weight of styrene, about 5 parts by weight of divinylbenzene as a cross-linking agent, and about 15 parts by weight of azobis butyronitrile as a polymerization initiator were added to the flask reactor, stirred sufficiently, heated to about 860° C., and then allowed to react for hours. When about 98% of the monomer was consumed, about 200 parts by weight of methylmethacrylate, about 50 parts by weight of styrene, about 5 parts by weight of divinylbenzene, and about 200 parts by weight of distilled water were added thereto, mixed sufficiently, and then reacted until 99.8% of the monomer was consumed.

Subsequently, the resulting reaction solution was cooled to about 20° C., and then subjected to reduced pressure to remove the monomer residue, followed by pH adjustment to about 7.0 with a 5 wt % aqueous solution of lithium hydroxide and a solid content adjustment to about 40% to obtain an emulsion of polymer particles. The solvent was removed from the emulsion, and the dried binder had a gel content of about 92%.

Preparation of Binder Composition for Secondary Battery

Example 101

About 30 parts by weight (dry weight basis) of the polymer emulsion of Preparation Example 3 (15 wt % solid content) having an average particle diameter of about 70 nm and about 4 parts by weight (dry weight basis) of a carbodiimide coupling agent (Carbodilite V-02-L2, available from Nisshinbo Chemical Inc., Tokyo, Japan) were added to about 100 parts by weight (dry weight basis) of the polymer emulsion of Preparation Example 1 (Binder A, 40 wt % solid content) having an average particle diameter of about 120 nm, and then stirred for about 10 minutes to prepare a binder composition dispersion for a secondary battery.

Example 102

A binder composition dispersion for a secondary battery was prepared following the same procedures described in Example 101, except that about 2 parts by weight (dry weight basis) of a carbodiimide coupling agent (Carbodilite V-02-L2, available from Nisshinbo Chemical Inc., Tokyo, Japan) was added.

Example 103

A binder composition dispersion for a secondary battery was prepared in substantially the same manner as in Example 101, except that about 4 parts by weight (dry weight basis) of a carbodiimide coupling agent (Carbodilite V-02-L2, available from Nisshinbo Chemical Inc., Tokyo, Japan) was added.

Example 104

About 20 parts by weight (dry weight basis) of the polymer emulsion of Preparation Example 103 (15 wt % solid content) having an average particle diameter of about 70 nm and about 1 part by weight of γ-glycidoxypropyltrimethoxysilane as a silane coupling agent were added to about 100 parts by weight (dry weight basis) of the polymer emulsion of Preparation Example 102 (Binder B, 40 wt % solid content) having an average particle diameter of about 120 nm, and then stirred for about 10 minutes to prepare a binder composition dispersion for a secondary battery.

Example 105

A binder composition dispersion for a secondary battery was prepared following the same procedures described in Example 104, except that about 2 parts by weight of γ-glycidoxypropyltrimethoxysilane as a silane coupling agent was added.

Example 106

A binder composition dispersion for a secondary battery was prepared following the same procedures described in Example 104, except that about 4 parts by weight of γ-glycidoxypropyltrimethoxysilane as a silane coupling agent was added.

Comparative Example 101

The emulsion of Comparative Preparation Example 101 was used as a binder composition dispersion for a secondary battery.

Comparative Example 102

The emulsion of Comparative Preparation Example 102 was used as a binder composition dispersion for a secondary battery.

Comparative Example 103

Binder Composition Dispersion not Including Particles Having a Tg of about 60° C. or Greater The emulsion (Binder A, 40 wt % solid content) of Preparation Example 101, including polymer particles having an average particle diameter of about 120 nm, was used as a binder composition dispersion for a secondary battery.

Manufacture of Anode and Lithium Battery

Example 107

A Si—Fe alloy active material (CV3, available from 3M, Minnesota, USA) having an average particle diameter (d50) of about 3 μm, artificial graphite (MAG, available from Hitachi Chemical Co., Ltd., Tokyo, Japan), and carboxymethylcellulose (CMC) were mixed in pure water, and then the binder composition dispersion of Example 1 for a secondary battery was added thereto to prepare an active material slurry with a weight ratio of Si—Fe alloy:graphite:CMC:binder (solid content) of about 20:77:1:2.

The active material slurry was coated on a 10 μm-thick copper (Cu) foil to a thickness of about 90 μm, dried at about 110° C. for about 30 minutes, and then roll-pressed to a thickness of about 70 μm to form an anode plate, which was then used to form a coin cell (CR2016) having a diameter of about 32 mm.

In manufacturing the coin cell, metal lithium as a counter electrode, a polyethylene separator (Star® 20) having a thickness of about 20 μm, and an electrolyte solution of 1.15M $LiPF_6$ dissolved in a mixed solvent of ethylene carbonate (EC), ethylmethyl carbonate (EMC), and diethyl carbonate (DEC) in a 3:3:4 volume ratio were used.

Examples 108 to 112

Anodes and lithium batteries were manufactured following the same procedures described in Example 007, except that the binder compositions dispersions of Examples 102 to 106 were used, respectively.

Comparative Examples 104 to 106

Anodes and lithium batteries were manufactured following the same procedures described in Example 007, except that the binder composition dispersions of Comparative Examples 101 to 103 were used, respectively.

Evaluation Example 101

High-Temperature Elastic Modulus Measurement

The binder compositions dispersions of Examples 101 to 106 and Comparative Examples 101 to 103 were each coated on a substrate, and then dried at room temperature for about 24 hours to remove the solvent and form a film, which was then removed from the substrate for use as a binder composition sample. The binder composition samples were each cut to a size of 0.8 cm (width)×3 cm (length)×6 mm (thickness), and then loaded into a Tensile Tester (available from Instron) to measure change in strain with respect to stress, according to the ASTM Standard. An elastic modulus (E) at about 60° C. was calculated from the slope of a stress-strain curve of the binder composition sample. In Table 101, MPa denotes mega pascal.

Figure 2:
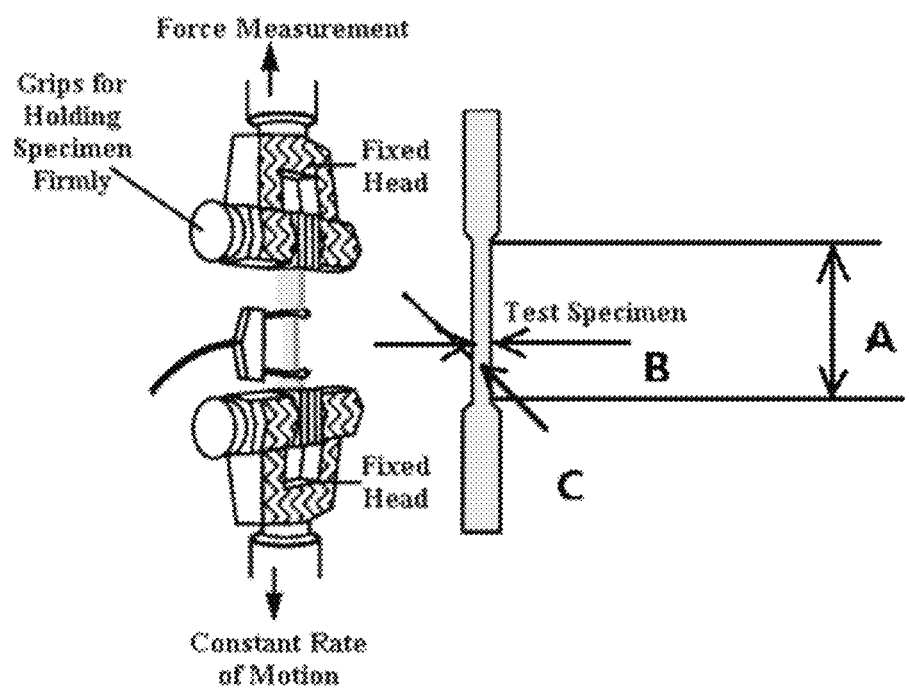
FIG. 2 is a schematic view of a system for measuring elastic moduli and breaking strengths of binder composition.

In FIGS. 2, A, B, and C denote the length, width, and thickness of the binder sample, respectively.

TABLE 101

| Example | Elastic modulus [MPa] |
| --- | --- |
| Example 1 | 62 |
| Example 2 | 81 |
| Example 3 | 93 |
| Example 4 | 54 |
| Example 5 | 68 |
| Example 6 | 81 |
| Comparative Example 1 | 28 |
| Comparative Example 2 | — |
| Comparative Example 3 | 10 |

Referring to Table 101, the binders obtained from the binder composition dispersions of Examples 101 to 106 for secondary batteries were found to have surprisingly increased elastic moduli, compared to those of the binders obtained from the binder composition dispersions of Comparative Examples 101 to 103. Since it was impossible to form a binder film from the binder composition dispersion of Comparative Example 102, the physical characteristics thereof was not measured.

Evaluation Example 102

Measurement of Breaking Strength of Electrolyte-Impregnated Binder Film

The binder composition dispersions of Examples 101 to 106 and Comparative Examples 101 to 103 for secondary batteries were each put into a Teflon petri dish having a diameter of about 12 cm and then dried at room temperature for about 2 days to obtain a binder film having a thickness of about 0.6 mm. The binder film was dried further in a 70° C.-vacuum drier for about 10 hours to completely remove moisture, and then cut into a binder sample having a length of about 5 cm and a width of about 5 mm for breaking strength measurement.

In FIGS. 2, A, B, and C denote the length, width, and thickness of the binder sample, respectively.

The binder sample was dipped in a mixed solvent for electrolyte of ethylene carbonate (EC), ethylmethylcarbonate (EMC) and diethyl carbonate (DEC) in a volume ratio of about 3:5:2 at about 70° C. for about 72 hours. After wiping the mixed solvent for electrolyte from the binder sample, the breaking strength of the binder sample was measured using a Tensile Tester at a tension speed of about 100 cm/min.

Breaking strengths of four electrolyte-impregnated binder samples for each of Examples 101 to 106 and Comparative Examples 101 to 103 were measured to calculate a breaking strength according to Equation 101 below.

$$\text{Breaking Strength of binder composition sample} = \text{Most strong breaking strength of binder composition samples} \times 0.5 + \text{Second most strong breaking strength of binder composition samples} \times 0.3 + \text{Third most strong breaking strength of binder composition samples} \times 0.1 + \text{Weakest breaking strength of binder composition samples} \times 0.1$$

⟨Equation 101⟩

The results are shown in Table 102 below.

TABLE 102

| Example | Breaking strength [kg/cm²] |
| --- | --- |
| Example 1 | 40 |
| Example 2 | 68 |
| Example 3 | 82 |
| Example 4 | 35 |
| Example 5 | 52 |
| Example 6 | 55 |
| Comparative Example 1 | 7 |
| Comparative Example 2 | — |
| Comparative Example 3 | 23 |

Referring to Table 102, the binder compositions (binder films) obtained from the binder composition dispersions of Examples 101 to 106 for secondary batteries were found to have increased breaking strengths of about 30 kg/cm² or greater when combined with electrolyte, compared to those of the binder compositions obtained from the binder composition dispersions of Comparative Examples 101 to 103.

It was impossible to form a binder film from the binder composition dispersion of Comparative Example 102 and the physical characteristics thereof was not measured.

Evaluation Example 103

Evaluation of Charge-Discharge Characteristics and Electrode Expansion Ratio The coin cells manufactured in Examples 107 to 112 and Comparative Examples 104 to 106 were each charged with a constant current of 0.05 C rate at 25° C. to a voltage of about 0.01V (with respect to Li), and then with a constant voltage of about 0.01V to a current of about 0.02 C, followed by discharging with a constant current of 0.05 C to a voltage of about 1.5V (with respect to Li) (Formation Process)

Subsequently, each of the cells after the formation process was charged with a constant current of 0.2 C rate at about 25° C. to a voltage of about 0.01V (with respect to Li) and then with a constant voltage of about 0.01V to a current of 0.02 C, followed by discharging with a constant current of 0.2 C to a voltage of 1.5 V (with respect to Li) to evaluate an initial charge-discharge efficiency and performance of the cell.

After the evaluation of the initial capacity, each of the cells was charged with a constant current of 0.7 C rate at about 25° C. to a voltage of about 0.01V (with respect to Li) and then with a constant voltage of about 0.01V to a current of about 0.02 C, followed by discharging with a constant current of about 0.5 C to a voltage of about 1.5V (with respect to Li). This charge/discharge cycle was repeated 100 times.

Some of the results of the charge/discharge test are shown in Table 2 below. An electrode expansion ratio is defined by Equation 102 below.

After completion of the constant current/constant voltage charging at the 1st cycle, the cells were disassembled to measure thicknesses of an anode of the cell. The thickness of the anode before use (bare electrode), i.e., before the 1st cycle was also measured. The electrode expansion ratio of each cell was calculated using Equation 102. The results are shown in Table 103 below.

A capacity retention rate is defined by Equation 103 below.

$$\text{Electrode expansion ratio [\%]} = \left[\frac{\left(\begin{array}{c}\text{Thickness of anode after charging at } 1^{st} \\ \text{cycle} - \text{Thickness of unused anode}\end{array}\right)}{\text{Thickness of unused anode(bare electrode)}}\right] \times 100 \quad \text{(Equation 102)}$$

Capacity retention rate [%] = [Discharge capacity at $100^{th}$ cycle/Discharge capacity at $1^{st}$ cycle] × 100  (Equation 103)

TABLE 103

| Example | Cycle lifetime [%] | Electrode expansion ratio [%] |
|---|---|---|
| Example 107 | 78 | 43 |
| Example 108 | 81 | 40 |
| Example 109 | 83 | 35 |
| Example 110 | 75 | 45 |
| Example 111 | 78 | 42 |
| Example 112 | 80 | 39 |
| Comparative Example 104 | 65 | 50 |
| Comparative Example 105 | — | — |
| Comparative Example 106 | 55 | 68 |

Referring to Table 103, the lithium batteries (coin cells) of Examples 107 to 112 were found to have decreased electrode expansion ratios and good lifetime characteristics, compared to those of the lithium batteries of Comparative Examples 104 to 106.

In Comparative Example 105, it was impossible to manufacture an anode or a lithium battery from the binder composition dispersion of Comparative Example 102, and accordingly the physical characteristics thereof was not measured.

The lithium batteries of Examples 107 to 112 including the binder compositions with increased strengths or increased elastic modulli showed surprisingly improved lifetime characteristics due to the reduced electrode expansion ratios.

Preparation of First Polymer Binder Particle Emulsion

Preparation Example 201

Binder A

After charging a flask reactor equipped with a condenser, a thermometer, a monomer emulsion inlet, a nitrogen gas inlet, and a stirrer with nitrogen gas, about 200 parts by weight of distilled water and about 0.5 parts by weight of sodium dodecylbenzene sulfonate were added to the flask reactor, and the temperature of the flask reactor was increased to about 60° C. Subsequently, a monomer mixture of about 1.0 part by weight of potassium persulfate, about 0.5 parts by weight of sodium bisulfite, about 0.2 parts by weight of α-methylstyrene dimer, about 0.2 parts by weight of t-dodecyl mercaptane, about 34 parts by weight of butadiene, about 30 parts by weight of styrene, about 17 parts by weight of methylmethacrylate, about 10 parts by weight of acrylonitrile, about 7 parts by weight of methacrylic acid, and about 2 parts by weight of acrylic acid were added simultaneously to the flask reactor at about 45° C. and then stirred. When the polymerization conversion rate reached about 40%, about 0.4 parts by weigh of t-dodecyl mercaptane was added thereto and the resultant mixture was stirred. When the polymerization conversion rate reached about 80%, the reaction temperature was increased to about 60° C., followed by further reaction for about 6 hours until the polymerization conversion rate reached about 98%. Subsequently, the resulting reaction solution was cooled to about 20° C., and then subjected to reduced pressure to remove the monomer residue, followed by pH adjustment to about 7.0 with a 5 wt % aqueous solution of lithium hydroxide and a solid content adjustment to about 40% to obtain an acrylic acid ester-based polymer emulsion. Polymer binder particles dispersed in the emulsion had an average particle diameter of about 120 nm and a Tg of about 17° C., and a gel content of about 70%.

The polymer binder particles included a carboxyl group (—COOH) as a polar functional group.

Preparation Example 202

Binder B

After charging a flask reactor equipped with a condenser, a thermometer, a monomer emulsion inlet, a nitrogen gas inlet, and a stirrer with nitrogen gas, about 200 parts by weight of distilled water and about 0.5 parts by weight of sodium dodecylbenzene sulfonate were added to the flask reactor, and the temperature of the flask reactor was increased to about 60° C. Subsequently, a monomer mixture of about 1.0 part by weight of potassium persulfate, about 0.5 parts by weight of sodium bisulfite, about 0.2 parts by weight of α-methylstyrene dimer, about 0.2 parts by weight of t-dodecyl mercaptane, about 34 parts by weight of butadiene, about 31 parts by weight of styrene, about 12 parts by weight of methylmethacrylate, about 15 parts by weight of acrylonitrile, about 2 parts by weight of methacrylic acid, about 2 parts by weight of acrylic acid, and about 4 parts by weight of hydroxyethyl methacrylate were added simultaneously to the flask reactor at and the resultant mixture was heated to about 45° C., and stirred. When a polymerization conversion rate reached about 40%, about 0.3 parts by weigh of t-dodecyl mercaptan was added thereto and the resultant mixture was stirred. When the polymerization conversion rate reached about 80%, the reaction temperature was increased to about 60° C., followed by further stirring for about 6 hours until the polymerization conversion rate reached about 98%. Subsequently, the resulting reaction solution was cooled to about 20° C., and then subjected to reduced pressure to remove the monomer residue, followed by pH adjustment to about 7.0 with a 5 wt % aqueous solution of lithium hydroxide and a solid content adjustment to about 40% to obtain an acrylic acid ester-based polymer emulsion. Polymer binder particles dispersed in the emulsion had an average particle diameter of about 110 nm and a Tg of about 11° C., and a gel content of about 72%.

The polymer binder particles included a hydroxy group (—OH) as a polar functional group.

Preparation of Binder Composition for Secondary Battery

Example 201

$MgF_2$

About 40 parts by weight (dry weight basis) of magnesium fluoride ($MgF_2$) having an average particle diameter of about 50 nm and about 1 parts by weight (dry weight basis) of a carbodiimide coupling agent (Carbodilite V-02-L2, available from Nisshinbo Chemical Inc., Tokyo, Japan) were added to about 100 parts by weight (dry weight basis) of the polymer emulsion of Preparation Example 201 (Binder A, 40 wt % solid content) having an average particle diameter of about 120 nm, and then stirred for about 10 minutes to prepare a binder composition dispersion for a secondary battery.

Example 202

Alpha Alumina

A binder composition dispersion for a secondary battery was prepared in substantially the same manner as in Example 201, except that about 40 parts by weight (dry weight basis) of a alpha-alumina (available from CIK Nanotech, Japan) having an average particle diameter of about 100 nm, instead of magnesium fluoride, was added.

Example 203

Cross-Linked PMMA

A binder composition dispersion for a secondary battery was prepared in substantially the same manner as in Example 201, except that about 25 parts by weight (dry weight basis) of a cross-linked polymethylmethacrylate (PMMA) emulsion (EPOSTAR MX030W, available from Nippon Shokubai, Tokyo, Japan) having an average particle diameter of about 50 nm, instead of magnesium fluoride, was added.

Example 204

PU

A binder composition dispersion for a secondary battery was prepared following substantially the same procedures described in Example 201, except that about 30 parts by weight (dry weight basis) of a polyurethane (PU) emulsion (35 wt % solid content) having an average particle diameter of about 30 nm, instead of magnesium fluoride, was added.

The PU emulsion having a 35 wt % solid content was prepared by adding 150 parts by weight of ion-exchange water to about 100 parts by weight of a commercially purchased PU emulsion (SUPERFLEX 130, available from Dai-ichi Kogyo Seiyaku Co., Ltd., Tokyo, Japan, Tg; 101° C.) and removing the solvent by evaporation under a reduced pressure using a rotary evaporator until the solid content reached about 35 wt %.

Comparative Example 201

A binder composition dispersion for a secondary battery was prepared following the same procedures described in Example 201, except that about 4 parts by weight (dry weight basis) of a gamma-alumina (available from CIK Nanotech, Japan) having an average particle diameter of about 30 nm, instead of magnesium fluoride, was added.

Comparative Example 202

A binder composition dispersion for a secondary battery was prepared following the same procedures described in Example 201, except that colloidal silica ($SiO_2$, Snow-Tex C, available from Nissan Chemical Industries Ltd., Tokyo, Japan) having an average particle diameter of about 10 nm, and about 1 part by weight of γ-glycidoxypropyltrimethoxysilane as a silane coupling agent, instead of magnesium fluoride and carbodiimide coupling agent, respectively, were used.

Comparative Example 203

A binder composition dispersion for a secondary battery was prepared following the same procedures described in Comparative Example 201, except that the polymer emulsion of Preparation Example 202 (Binder B, 40 wt % solid content) having an average particle diameter of about 110 nm, instead of the polymer emulsion of Preparation Example 201 (Binder A) having an average particle diameter of about 120 nm, was used.

Comparative Example 204

A binder composition dispersion for a secondary battery was prepared following the same procedures described Comparative Example 202, except that the polymer emulsion of Preparation Example 202 (Binder B, 40 wt % solid content) having an average particle diameter of about 110 nm, instead of the polymer emulsion of Preparation Example 201 (Binder A) having an average particle diameter of about 120 nm, was used.

Manufacture of Anode and Lithium Battery

Example 205

A Si—Fe alloy active material (CV3, available from 3M, Minnesota, USA) having an average particle diameter (d50) of about 3 μm, artificial graphite (MAG, available from Hitachi Chemical Co., Ltd., Tokyo, Japan), and carboxymethylcellulose (CMC) were mixed in distilled water, and then the binder composition dispersion of Example 1 for a secondary battery was added thereto to prepare an active material slurry with a weight ratio of Si—Fe alloy:graphite:CMC:binder (solid content) of about 20:77:1:2.

The active material slurry was coated on a 10 μm-thick copper (Cu) foil to a thickness of about 90 μm, dried at about 110° C. for about 30 minutes, and then roll-pressed to a thickness of about 70 μm to form an anode plate, which was then used to form a coin cell (CR2016) having a diameter of about 32 mm.

In manufacturing the coin cell, metal lithium as a counter electrode, a polyethylene separator (Star® 20) having a thickness of about 20 μm, and an electrolyte solution of 1.15M $LiPF_6$ dissolved in a mixed solvent of ethylene carbonate (EC), ethylmethyl carbonate (EMC), and diethyl carbonate (DEC) in a 3:3:4 volume ratio were used.

Examples 206 to 208

Anodes and lithium batteries were manufactured following the same procedures described in Example 205, except that the binder compositions dispersions of Examples 202 to 204 were used, respectively.

Comparative Examples 205 to 208

Anodes and lithium batteries were manufactured following the same procedures described in Example 205, except that the binder compositions dispersions of Comparative Examples 201 to 204 were used, respectively.

Evaluation Example 201

High-Temperature Elastic Modulus Measurement

The binder compositions dispersions of Examples 201 to 204 and Comparative Examples 201 to 204 were each coated on a substrate and then dried at room temperature for about 24 hours to remove the solvent and form a film. The film was then removed from the substrate for use as a binder composition sample.

The binder composition samples were each cut to a size of 0.8 cm (width)×3 cm (length)×6 mm (thickness) and then loaded into a Tensile Tester (available from Instron) to measure change in strain with respect to stress, according to the ASTM Standard. An elastic modulus (E) at about 60° C. was calculated from the slope of a stress-strain curve of the binder composition sample. In Table 201, MPa denotes mega pascal.

In FIGS. 2, A, B, and C denote the length, width, and thickness of the binder composition sample, respectively.

TABLE 201

| Example | Elastic modulus [MPa] |
| --- | --- |
| Example 201 | 93 |
| Example 202 | 74 |
| Example 203 | 82 |
| Example 204 | 105 |
| Comparative Example 201 | 73 |
| Comparative Example 202 | 96 |
| Comparative Example 203 | 102 |
| Comparative Example 204 | 110 |

Referring to Table 201, the binder composition samples prepared from the binder composition dispersions of Examples 201 to 204 were found to have similar elastic moduli to those of the binder composition samples prepared from the binder composition dispersions of Comparative Examples 201 to 204.

Evaluation Example 202

Measurement of Breaking Strength of Electrolyte-Impregnated Binder Film

The binder compositions dispersions of Examples 201 to 204 and Comparative Examples 201 to 203 for secondary batteries were each added to a Teflon petri dish having a diameter of about 12 cm and then dried at room temperature for about 2 days to obtain a binder film having a thickness of about 0.6 mm. The binder film was dried further in a 70° C.-vacuum drier for about 10 hours to completely remove moisture, and then cut into a binder composition sample having a length of about 5 cm and a width of about 5 mm for breaking strength measurement.

In FIGS. 2, A, B, and C denote the length, width, and thickness of the binder composition sample, respectively.

The binder composition sample was dipped in a mixed electrolyte solvent of ethylene carbonate (EC), ethylmethyl carbonate (EMC) and diethyl carbonate (DEC) in a volume ratio of about 3:5:2 at about 70° C. for about 72 hours. After wiping the mixed electrolyte solvent from the binder composition sample, a breaking strength of the binder composition sample was measured using a Tensile Tester at a tensile speed of about 100 cm/min.

Breaking strengths of four electrolyte-impregnated binder composition samples for each of Examples 201 to 204 and Comparative Examples 201 and 203 were measured to calculate a breaking strength according to Equation 201 below.

$$\begin{aligned}\text{Breaking Strength of binder composition sample} =& \quad \langle\text{Equation 201}\rangle\\ &\text{Most strong breaking strength of}\\ &\text{binder composition samples} \times 0.5 +\\ &\text{Second most strong breaking strength}\\ &\text{of binder composition samples} \times 0.3 +\\ &\text{Third most strong breaking strength of binder}\\ &\text{composition samples} \times 0.1 + \text{Weakest breaking}\\ &\text{strength of binder composition samples} \times 0.1\end{aligned}$$

The results are shown in Table 202 below.

TABLE 202

| Example | Breaking strength [kg/cm$^2$] |
| --- | --- |
| Example 201 | 72 |
| Example 202 | 46 |
| Example 203 | 78 |
| Example 204 | 92 |
| Comparative Example 201 | 52 |
| Comparative Example 202 | 90 |
| Comparative Example 203 | 94 |
| Comparative Example 204 | 98 |

Referring to Table 202, the binder composition samples prepared from the binder composition dispersions of Examples 201 to 204 were found to have similar breaking strengths when combined with electrolyte, to those of the binder composition samples prepared from the binder composition dispersions of Comparative Examples 201 to 204.

Evaluation Example 203

Evaluation of Charge-Discharge Characteristics and Electrode Expansion Ratio The coin cells manufactured in Examples 205 to 208 and Comparative Examples 204 to 206 were each charged with a constant current of 0.05 C rate at 25° C. to a voltage of about 0.01V (with respect to Li), and then with a constant voltage of about 0.01V to a current of about 0.02 C, followed by discharging with a constant current of 0.05 C to a voltage of about 1.5V (with respect to Li) (Formation Process).

Subsequently, each of the lithium batteries after the formation process was charged with a constant current of 0.2 C rate at about 25° C. to a voltage of about 0.01V (with respect to Li) and then with a constant voltage of about 0.01V to a current of 0.02 C, followed by discharging with a constant current of 0.2 C to a voltage of 1.5 V (with respect to Li) to evaluate an initial charge-discharge efficiency and performance of the cell.

After the evaluation of the initial capacity, the cells were charged with a constant current of 0.7 C rate at about 25° C. to a voltage of about 0.01V (with respect to Li) and then with a constant voltage of about 0.01V to a current of about 0.02 C, followed by discharging with a constant current of about 0.5 C to a voltage of about 1.5V (with respect to Li). This charge/discharge cycle was repeated 100 times.

Some of the results of the charge/discharge test are shown in Table 201 below. An electrode expansion ratio is defined by Equation 202 below.

After completion of the constant current/constant voltage charging at the 1st cycle, the cells were disassembled to measure the thicknesses of an anode of the cell. The thickness of the anode before use (bare electrode), i.e., before the 1st cycle was also measured. The electrode expansion ratio of each cell was calculated using Equation 202.

A capacity retention rate is defined by Equation 203 below.

$$\text{Electrode expansion ratio [\%]} = \left[\frac{\left(\begin{array}{c}\text{Thickness of anode after charging at } 1^{st} \\ \text{cycle} - \text{Thickness of unused anode}\end{array}\right)}{\text{Thickness of unused anode}}\right] \times 100 \quad \text{(Equation 202)}$$

Capacity retention rate [%] = [Discharge capacity at $100^{th}$ cycle/Discharge capacity at $1^{st}$ cycle] × 100  (Equation 203)

TABLE 3

| Example | Cycle lifetime [%] | Electrode expansion ratio [%] |
|---|---|---|
| Example 205 | 78 | 39 |
| Example 206 | 76 | 42 |
| Example 207 | 81 | 37 |
| Example 208 | 83 | 35 |
| Comparative Example 205 | 0 | — |
| Comparative Example 206 | 22 | 80 |
| Comparative Example 207 | 0 | — |
| Comparative Example 208 | 28 | 76 |

Referring to Table 203, the lithium batteries (coin cells) of Examples 205 to 208 were found to have similar electrode expansion ratios to those of the lithium batteries of Comparative Examples 205 to 208, but have surprisingly improved lifetime characteristics. Since the lithium batteries according to Comparative Examples 205 and 207 were not operating properly, it was impossible to get data.

The lithium batteries of Examples 205 to 208 including nanoparticles that are inert or less reactive to hydrofluoric acid had surprisingly improved lifetime characteristics.

Preparation of First Polymer Binder Particle Emulsion

Preparation Examples 301 to 306

After charging a 10 L pressure-resistant reactor equipped with a condenser, a thermometer, a monomer emulsion inlet, a nitrogen gas inlet, and a stirrer with nitrogen gas, 60 parts by weight of distilled water and 1.5 parts by weight of sodium dodecylbenzene sulfonate were added to the flask reactor, and the temperature of mixture in the flask reactor was increased to about 70° C. Subsequently, about 2 parts by weight of styrene was added to the reactor and stirred for about 5 minutes, followed by adding about 10 parts by weight of a 2% aqueous solution of ammonium persulfate thereto to initiate the polymerization reaction. After 1 hour from the reaction initiation, a monomer mixture having one of the compositions in Table 301 below, and a monomer emulsion including about 0.5 parts by weight of sodium dodecylbenzene sulfonate and about 40 parts by weight of distilled water were added in a dropwise fashion to the reactor for about 3 hours, simultaneously with a dropwise addition of about 10 parts by weight of a 2% aqueous solution of potassium persulfate over about 3 hours. After completion of the dropwise addition of the monomer emulsion and the further stirring for about 3 hours, the resulting reaction solution was cooled to about 20° C., and then subjected to a reduced pressure to remove the monomer residue, followed by a pH adjustment to about 7.5 with a 5 wt % aqueous solution of lithium hydroxide and a solid content adjustment to about 40% to obtain a polymer emulsion.

In Preparation Examples 301 to 306, the monomer mixtures may include a cross-linkable monomer.

Comparative Preparation Examples 301 to 306

Polymer emulsions were prepared following the same procedures described in Preparation Examples 301 to 306, respectively, except that monomer mixtures having the compositions in Table 302 below were used, respectively.

In Comparative Preparation Examples 301 to 306, the monomer mixtures may include a cross-linkable monomer.

Preparation of Binder Composition for Secondary Battery

Examples 301 to 306

Binder composition dispersions for secondary batteries were prepared by selectively adding nanoparticles and coupling agents to the polymer emulsions of Preparation Examples 301 to 306 according to the compositions of Table 301 below, and then stiffing the mixtures for about 10 minutes.

TABLE 301

| | | Example | | | | | |
|---|---|---|---|---|---|---|---|
| | | 301 | 302 | 303 | 304 | 305 | 306 |
| Monomer mixture composition (glycidyl methacrylate and N-methylol acrylamide are cross-linkable monomers) | Butadiene | 33 | 37 | 42 | 48 | | |
| | 2-ethylhexylacrylate | | | | | 36.5 | 40.5 |
| | Styrene | 53 | 49 | 44 | 38 | | |
| | methyl methacrylate | 10 | 10 | 10 | 10 | | |
| | acrylonitrile | | | | | 15 | 15 |
| | isobornyl acrylate | | | | | 44 | 40 |
| | methacrylic acid | 2 | 2 | 3 | 2 | 1 | 1 |
| | acrylic acid | 1 | 1 | 1 | 1 | 1 | 1 |

TABLE 301-continued

|  |  | Example | | | | | |
|---|---|---|---|---|---|---|---|
|  |  | 301 | 302 | 303 | 304 | 305 | 306 |
|  | itaconic acid | 1 | 1 | 1 | 1 |  |  |
|  | hydroxyethylacrylate |  |  |  |  | 2 | 2 |
|  | ethylene dimethacrylate |  |  |  |  | 0.5 | 0.5 |
|  | glycidyl methacrylate |  |  | 3 | 1 |  |  |
|  | N-methylol acrylamide | 1.5 |  |  |  |  |  |
| binder | 1)CARBODILTE V02L2 |  | 0.5 |  |  | 1 | 1 | 1 |
| nanoparticle | 2)Magnesium fluoride |  |  |  | 30 |  |  |
|  | 3)EPOSTAR MX030W | 30 | 20 |  |  |  | 10 |
|  | 4)SUPERFLEX130 |  |  |  |  | 30 | 20 |

1)CARBODILITE V02L2; Nisshinbo Chemical Inc., Tokyo, Japan, - coupling agent
2)Magnesium fluoride (MgF$_2$); CIK NanoTek - inorganic nanoparticles having an average particle diameter of about 50 nm
3)EPOSTAR MX030W; Nippon Shokubai Tokyo, Japan - acryl-based organic polymer particles having an average particle diameter of about 40 nm (cross-linked PMMA)
4)SUPERFLEX130; Dai-ichi Kogyo Seiyaku Co., Ltd., Tokyo, Japan - urethane-based organic polymer particles having an average particle diameter of about 30 nm and a Tg of about 101° C.

In Table 301 above, the amounts of the components are listed as in parts by weight.

Comparative Example 301-306

Binder composition dispersions for secondary batteries were prepared by selectively adding nanoparticles and coupling agents to the polymer emulsions of Comparative Preparation Examples 301 to 306 according to the compositions of Table 302 below, and then stiffing mixtures for about 10 minutes.

TABLE 302

|  |  | Comparative Example | | | | | |
|---|---|---|---|---|---|---|---|
|  |  | 301 | 302 | 303 | 304 | 305 | 306 |
| Monomer mixture | butadiene | 29 | 29 | 50 |  | 29 | 30 |
| composition | 2-ethylhexylacrylate |  |  |  | 30.5 |  |  |
| (glycidyl | styrene | 57 | 57 | 36 |  | 57 | 54 |
| methacrylate and N- | methyl methacrylate | 10 | 10 | 10 |  | 10 | 10 |
| methylol acrylamide | acrylonitrile |  |  |  | 15 |  |  |
| are cross-linkable | isobornyl acrylate |  |  |  | 50 |  |  |
| monomers) | methacrylic acid | 1.5 | 1.5 | 1.5 | 1 | 1.5 | 2 |
|  | acrylic acid | 1 | 1 | 1 | 1 | 1 | 1 |
|  | itaconic acid | 1.5 | 1.5 | 1.5 |  |  |  |
|  | hydroxyethylacrylate |  |  |  | 2 |  |  |
|  | ethylene dimethacrylate |  |  |  | 0.5 |  |  |
|  | glycidyl methacrylate |  |  |  |  |  | 3 |
|  | N-methylol acrylamide |  |  |  |  | 1.5 |  |
| Binder | 1)CARBODILTE V02L2 |  |  | 1 | 1 |  |  |
| Nanoparticle | 2)magnesium fluoride |  |  |  |  |  |  |
|  | 3)EPOSTAR MX030W |  | 30 |  |  |  |  |
|  | 4)SUPERFLEX130 |  |  |  | 10 |  |  |

In Table 302, the amounts of the components are listed in parts by weight.

Manufacture of Anode and Lithium Battery

Example 307

A Si—Fe alloy active material (CV3, available from 3M, Minnesota, USA) having an average particle diameter (d50) of about 3 μm, artificial graphite (MAG, available from Hitachi Chemical Co., Ltd., Tokyo, Japan), and carboxymethylcellulose (CMC) were mixed in distilled water, and then the binder composition dispersion of Example 301 for a secondary battery was added thereto to prepare an active material slurry with a weight ratio of Si—Fe alloy:graphite:CMC:binder (solid content) of about 20:77:1:2.

The active material slurry was coated on a 10 μm-thick copper (Cu) foil to a thickness of about 90 μm, dried at about 110° C. for about 30 minutes, and then roll-pressed to a thickness of about 70 μm to form an anode plate, which was then used to form a coin cell (CR2016) having a diameter of about 32 mm.

In manufacturing the coin cell, metal lithium as a counter electrode, a polyethylene separator (Star® 20) having a thickness of about 20 μm, and an electrolyte solution of 1.15M LiPF$_6$ dissolved in a mixed solvent of ethylene carbonate (EC), ethylmethyl carbonate (EMC), and diethyl carbonate (DEC) using a 3:3:4 volume ratio.

Examples 308 to 312

Anodes and lithium batteries were manufactured in substantially the same manner as in Example 307, except that the binder composition dispersions of Examples 302 to 306 were used, respectively.

Comparative Examples 307 to 312

Anodes and lithium batteries were manufactured in substantially the same manner as in Example 007, except that the binder composition dispersions of Comparative Examples 301 to 306 were used, respectively.

Evaluation Example 301

High-Temperature Elastic Modulus Measurement

The binder composition dispersions of Examples 301 to 306 and Comparative Examples 301 to 306 were each coated on a substrate and then dried at room temperature for about 24 hours to remove the solvent and form a film. The film was then removed from the substrate for use as a binder composition sample. The binder composition samples were each cut to a size of 0.8 cm (width)×3 cm (length)×6 mm (thickness), and then loaded into a Tensile Tester (Dynamic Mechanical Analyzer (DMA) Q800, available from Instron, Norwood, U.S.) to measure an elastic modulus at about 60° C., according to the ASTM Standard. The results are shown in Table 303 below. In Table 303, MPa denotes mega pascal.

In FIGS. 2, A, B, and C denote the length, width, and thickness of the binder composition sample, respectively.

Evaluation Example 302

Glass Transition Temperature (Tg) Measurement

The glass transition temperatures (Tg) of the binder compositions of Preparation Examples 301 to 305 and Comparative Examples 301 to 306 for secondary batteries were measured based on the tan δ(delta) values of Modulus/temperature data obtained using a dynamic mechanical analyzer (DMA). The results are shown in Table 303 below.

Evaluation Example 303

Measurement of Breaking Strength of Electrolyte-Impregnated Binder Film

The binder composition dispersions of Examples 301 to 306 and Comparative Examples 301 to 306 for secondary batteries were each put into a Teflon petri dish having a diameter of about 12 cm and then dried at room temperature for about 2 days to obtain a binder film having a thickness of about 0.6 mm. The binder film was dried further in a 70° C.-vacuum drier for about 10 hours to completely remove moisture, and then cut into a binder composition sample having a length of about 5 cm and a width of about 5 mm for breaking strength measurement.

In FIGS. 2, A, B, and C denote the length, width, and thickness of the binder composition sample, respectively.

The binder composition sample was dipped in a mixed electrolyte solvent of ethylmethyl carbonate (EC), ethylmethyl carbonate (EMC) and diethyl carbonate (DEC) in a volume ratio of about 3:5:2 at about 70° C. for about 72 hours. After wiping the mixed electrolyte solvent from the binder composition sample, the breaking strength of the binder composition sample was measured using a Tensile Tester at a tension speed of about 100 cm/min.

Breaking strengths of four electrolyte-impregnated binder composition samples for each of Examples 301 to 306 and Comparative Examples 301 and 306 were measured to calculate a breaking strength according to Equation 301 below.

$$\begin{aligned}\text{Breaking Strength of binder composition sample} = &\quad \langle\text{Equation 301}\rangle\\ \text{Most strong breaking strength of}&\\ \text{binder composition samples} \times 0.5 +&\\ \text{Second most strong breaking strength}&\\ \text{of binder composition samples} \times 0.3 +&\\ \text{Third most strong breaking strength of binder}&\\ \text{composition samples} \times 0.1 + \text{Weakest breaking}&\\ \text{strength of binder composition samples} \times 0.1&\end{aligned}$$

The results are shown in Table 303 below. In Table 303, Tg indicate the glass transition temperatures of the polymer binders prepared from the binder compositions of Preparation Examples 301 to 306 and Comparative Preparation Examples 301 to 306.

TABLE 303

| Example | Elastic modulus [MPa] | Tg [° C.] | Breaking strength [kg/cm²] |
|---|---|---|---|
| Example 301 | 100 | 10 | 90 |
| Example 302 | 120 | 1 | 100 |
| Example 303 | 90 | −8 | 80 |
| Example 304 | 55 | −19 | 35 |
| Example 305 | 65 | 17 | 40 |
| Example 306 | 70 | 9 | 90 |
| Comparative Example 301 | 10 | 18 | 23 |
| Comparative Example 302 | 15 | 28 | 24 |
| Comparative Example 303 | 5 | −22 | 22 |
| Comparative Example 304 | 5 | 31 | 21 |
| Comparative Example 305 | 5 | 19 | 24 |
| Comparative Example 306 | 6 | 16 | 22 |

Referring to Table 303, the binder of Examples 301 to 306 were found to have surprisingly improved breaking strengths when impregnated with electrolyte, compared to those of the binder of Comparative Examples 301 to 306, and thus may exhibit improved binder strength when used in a battery cell to effectively suppress expansion of the battery.

Evaluation Example 304

Evaluation of Charge-Discharge Characteristics and Electrode Expansion Ratio

The coin cells manufactured in Examples 307 to 312 and Comparative Examples 307 to 312 were each charged with a constant current of 0.05 C rate at 25° C. to a voltage of about 0.01V (with respect to Li), and then with a constant voltage of about 0.01V to a current of about 0.02 C, followed by discharging with a constant current of 0.05 C to a voltage of about 1.5V (with respect to Li) (Formation Process)

Subsequently, each of the cells after the formation process was charged with a constant current of 0.2 C rate at about 25° C. to a voltage of about 0.01V (with respect to Li) and then with a constant voltage of about 0.01V to a current of 0.02 C, followed by discharging with a constant current of 0.2 C to a voltage of 1.5 V (with respect to Li) to evaluate an initial charge-discharge efficiency and performance of the cell.

After the evaluation of the initial capacity, each of the cells was charged with a constant current of 0.7 C rate at about 25° C. to a voltage of about 0.01V (with respect to Li) and then with a constant voltage of about 0.01V to a current of about 0.02 C, followed by discharging with a constant current of about 0.5 C to a voltage of about 1.5V (with respect to Li). This charge/discharge cycle was repeated 100 times.

Some of the results of the charge/discharge test are shown in Table 304 below.

The electrode expansion ratio is defined by Equation 302 below.

After completion of the constant current/constant voltage charging at the 1st cycle, the cells were disassembled to measure thicknesses of an anode of the cell. The thickness of the anode before use (bare electrode), i.e., before the 1st cycle was also measured. The electrode expansion ratio of each cell was calculated using Equation 302. The results are shown in Table 304 below.

A capacity retention rate is defined by Equation 303 below.

$$\text{Electrode expansion ratio [\%]} = \frac{\begin{pmatrix} \text{Thickness of anode after charging at } 1^{st} \\ \text{cycle} - \text{Thickness of unused electrode} \end{pmatrix}}{\text{Thickness of unused anode(bare electrode)}} \times 100 \quad \text{(Equation 302)}$$

$$\text{Capacity retention rate [\%]} = [\text{Discharge capacity at } 100^{th} \text{ cycle} / \text{Discharge capacity at } 1^{st} \text{ cycle}] \times 100 \quad \text{(Equation 303)}$$

TABLE 304

| Example | Cycle lifetime [%] | Electrode expansion ratio [%] |
|---|---|---|
| Example 307 | 82 | 35 |
| Example 308 | 83 | 37 |
| Example 309 | 80 | 36 |
| Example 310 | 80 | 48 |
| Example 311 | 75 | 43 |
| Example 312 | 78 | 39 |
| Comparative Example 307 | 65 | 58 |
| Comparative Example 308 | — | — |
| Comparative Example 309 | 66 | 55 |
| Comparative Example 310 | — | — |
| Comparative Example 311 | 63 | 62 |
| Comparative Example 312 | 62 | 68 |

Referring to Table 304, the lithium batteries (coin cells) of Examples 307 to 312 were found to have decreased electrode expansion ratios and good lifetime characteristics, compared to those of the lithium batteries of Comparative Examples 307 to 312.

In Comparative Examples 308 and 310, cracking of electrodes occurred during manufacture of the electrodes of lithium batteries, so the electrode expansion ratios thereof were not measured.

Preparation of First Polymer Binder Particle Emulsion

Preparation Example 401

Binder A

After charging a flask reactor equipped with a condenser, a thermometer, a monomer emulsion inlet, a nitrogen gas inlet, and a stirrer with nitrogen gas, about 200 parts by weight of distilled water and about 0.5 parts by weight of sodium dodecylbenzene sulfonate were added to the flask reactor, and the temperature of the mixture in the flask reactor was increased to about 60° C. Subsequently, a monomer mixture of about 1.0 part by weight of potassium persulfate, about 0.5 parts by weight of sodium bisulfite, about 0.2 parts by weight of α-methylstyrene dimer, about 0.2 parts by weight of t-dodecyl mercaptane, about 34 parts by weight of butadiene, about 30 parts by weight of styrene, about 17 parts by weight of methylmethacrylate, about 10 parts by weight of acrylonitrile, about 7 parts by weight of methacrylic acid, and about 2 parts by weight of acrylic acid were added simultaneously to the flask reactor at about 45° C. and then stirred. When a polymerization conversion rate reached about 40%, about 0.4 parts by weigh of t-dodecyl mercaptane was added thereto and the resultant reaction mixture was stirred. When the polymerization conversion rate reached about 80%, the reaction temperature was increased to about 60° C., followed by further stirring for about 6 hours until the polymerization conversion rate reached about 98%. Subsequently, the resulting reaction solution was cooled to about 20° C., and then subjected to reduced pressure to remove the monomer residue, followed by pH adjustment to about 7.0 with a 5 wt % aqueous solution of lithium hydroxide and a solid content adjustment to about 40% to obtain an acrylic acid ester-based polymer emulsion. Polymer binder particles dispersed in the emulsion had an average particle diameter of about 120 nm and a Tg of about 17° C., and a gel content of about 70%.

Preparation Example 402

Binder B

After charging a flask reactor equipped with a condenser, a thermometer, a monomer emulsion inlet, a nitrogen gas inlet, and a stirrer with nitrogen gas, about 200 parts by weight of distilled water and about 0.5 parts by weight of sodium dodecylbenzene sulfonate were added to the flask reactor, and the temperature of the mixture in the flask reactor was increased to about 60° C. Subsequently, a monomer mixture of about 1.0 part by weight of potassium persulfate, about 0.5 parts by weight of sodium bisulfite, about 0.2 parts by weight of α-methylstyrene dimer, about 0.2 parts by weight of t-dodecyl mercaptane, about 34 parts by weight of butadiene, about 31 parts by weight of styrene, about 12 parts by weight of methylmethacrylate, about 15 parts by weight of acrylonitrile, about 2 parts by weight of methacrylic acid, about 2 parts by weight of acrylic acid, and about 4 parts by weight of hydroxyethyl methacrylate were added simultaneously to the flask reactor at about 45° C., and then stirred. When a polymerization conversion rate reached about 40%, about 0.3 parts by weigh of t-dodecyl mercaptane was added thereto and the resultant mixture was stirred. When the polymerization conversion rate reached about 80%, the reaction temperature was increased to about 60° C., followed by further reaction for about 6 hours until the polymerization conversion rate reached about 98%. Subsequently, the resulting reaction solution was cooled to about 20° C., and then subjected to reduced pressure to remove the monomer residue, followed by pH adjustment to about 7.0 with a 5 wt % aqueous solution of lithium hydroxide and a solid content adjustment to about 40% to obtain an acrylic acid ester-based polymer emulsion. Polymer binder particles dispersed in the emulsion had an average particle diameter of about 110 nm and a Tg of about 11° C., and a gel content of about 70%.

Preparation of First Nanoparticle Emulsion

Preparation Example 403

After charging a flask reactor equipped with a condenser, a thermometer, a monomer emulsion inlet, a nitrogen gas inlet, and a stirrer with nitrogen gas, 500 parts by weight of distilled water and 3 parts by weight of sodium dodecylbenzene sulfonate were added to the flask reactor, and the temperature of the mixture in the flask reactor was increased to about 80° C. Subsequently, about 2 parts by weight of methylmethacrylate was added to the flask reactor and stirred for about 5 minutes, followed by addition of about 20 parts by weight of a 5% aqueous solution of ammonium persulfate thereto to initiate the reaction. After 1 hour, a monomer emulsion including about 93 parts by weight of methylmethacrylate, about 2 parts by weight of acrylic acid, about 4 parts by weight of methacrylic acid, about 1 part by weight of ethylene dimethacrylate, about 0.5 parts by weight of sodium dodecylbenzene sulfonate, and about 40 parts by weight of distilled water was added in a dropwise fashion to the flask reactor for about 3 hours, simultaneously with a dropwise addition of about 10 parts by weight of a 5% aqueous solution of ammonium persulfate over about 3 hours. After completion of the dropwise addition of the monomer emulsion, further reaction was performed for about 1 hour until a polymerization conversion rate reached about 98.9%. Subsequently, the resulting reaction solution was cooled to about 20° C. and then subjected to reduced pressure to remove the monomer residue, followed by pH adjustment to about 8.0 with a 5 wt % aqueous solution of lithium hydroxide and a solid content adjustment to about 40% to obtain an emulsion of polymer particles having a Tg of about 100° C. The polymer particles dispersed in the emulsion had an average particle diameter of about 70 nm.

Preparation Example 404

After charging a flask reactor equipped with a condenser, a thermometer, a monomer emulsion inlet, a nitrogen gas inlet, and a stirrer with nitrogen gas, 500 parts by weight of distilled water and 3 parts by weight of sodium dodecylbenzene sulfonate were added to the flask reactor, and the temperature of the mixture in the flask reactor was increased to about 80° C. Subsequently, about 2 parts by weight of methylmethacrylate was added to the flask reactor and stirred for about 5 minutes, followed by adding about 20 parts by weight of a 5% aqueous solution of ammonium persulfate thereto to initiate the reaction. After 1 hour, a monomer emulsion including about 99 parts by weight of methylmethacrylate, about 1 part by weight of ethylene dimethacrylate, about 2 parts by weight of sodium dodecylbenzene sulfonate, and about 40 parts by weight of distilled water was added in a dropwise fashion to the flask reactor for about 3 hours, concurrently with a dropwise addition of about 10 parts by weight of a 5% aqueous solution of ammonium persulfate over about 3 hours. After completion of the dropwise addition of the monomer emulsion, further reaction was performed for about 1 hour until a polymerization conversion rate reached about 98.7%. Subsequently, the resulting reaction solution was cooled to about 20° C. and then subjected to reduced pressure to remove the monomer residue, followed by pH adjustment to about 8.0 with a 5 wt % aqueous solution of lithium hydroxide and a solid content adjustment to about 40% to obtain an emulsion of polymer particles having a Tg of about 108° C. The polymer particles dispersed in the emulsion had an average particle diameter of about 70 nm.

Comparative Preparation Example 401

After charging a flask reactor equipped with a condenser, a thermometer, a monomer emulsion inlet, a nitrogen gas inlet, and a stirrer with nitrogen gas, a monomer mixture of about 200 parts by weight of distilled water, about 0.5 parts by weight of sodium dodecylbenzene sulfonate, about 1.0 part by weight of potassium persulfate, about 0.5 parts by weight of sodium bisulfite, about 33 parts by weight of styrene, about 36 parts by weight of butadiene, about 30 parts by weight of methylmethacrylate, about 1 part by weight of itaconic acid, about 0.1 parts by weight of α-methyl styrene dimer, and about 0.2 parts by weight of t-dodecyl mercaptane was added simultaneously to the flask reactor and the mixture was heated to about 45° C. and then stirred for about 6 hours. When a polymerization conversion rate reached about 70%, a monomer mixture of about 66 parts by weight of styrene, about 9 parts by weight of butadiene, about 18 parts by weight of methylmethacrylate, about 4 parts by weight of butylacrylate, about 1 part by weight of acrylic acid, about 2 parts by weight of itaconic acid, about 0.2 parts by weight of α-methyl styrene dimer, and about 0.1 parts by weight of t-dodecyl mercaptan was added at 60° C. over about 7 hours, with stirring. After completion of the addition of the monomer mixture, the mixture was stirred about 70° C. for about 6 hours until the polymerization conversion rate reached about 98% to 99%. Subsequently, the resulting reaction solution was cooled to about 20° C., and then subjected to reduced pressure to remove the monomer residue, followed by pH adjustment to about 7.0 with a 5 wt % aqueous solution of lithium hydroxide and a solid content adjustment to about 40% to obtain an emulsion of polymer particles. The copolymer of core forming monomers in the emulsion had a Tg of about 0° C., and a copolymer of shell forming monomers in the emulsion had a Tg of about 60° C.

Comparative Preparation Example 402

After charging a flask reactor equipped with a condenser, a thermometer, a monomer emulsion inlet, a nitrogen gas inlet, and a stirrer with nitrogen gas, about 1500 parts by weight of distilled water, about 25 parts by weight of sodium dodecylbenzene sulfonate, about 400 parts by weight of 1,3-butadiene, about 200 parts by weight of styrene, about 5 parts by weight of divinylbenzene as a cross-linking agent, and about 15 parts by weight of azo bis(butyronitrile) as a polymerization initiator were added to the flask reactor, stirred, and the mixture was then heated to about 860° C., with stirring. When 98% of the monomer was consumed, about 200 parts by weight of methylmethacrylate, about 50 parts by weight of styrene, about 5 parts by weight of divinylbenzene, and about 200 parts by weight of distilled water were added thereto, and the resultant mixture was stirred until 99.8% the monomer consumed. Subsequently, the resulting reaction solution was cooled to about 20° C., and then subjected to reduced pressure to remove the monomer residue, followed by pH adjustment to about 7.0 with a 5 wt % aqueous solution of lithium hydroxide and a solid content adjustment to about 40% to obtain an emulsion of polymer particles. The solvent was removed from the emulsion, and the dried binder had a gel content of about 92%.

Preparation of Binder Composition for Secondary Battery

Example 401

About 30 parts by weight (dry weight basis) of the polymer emulsion of Preparation Example 3 (15 wt % solid content) having an average particle diameter of about 70 nm and about 41 part by weight (dry weight basis) of a carbodiimide coupling agent (Carbodilite V-02-L2, available from Nisshinbo Chemical Inc., Tokyo, Japan) were added to about 100 parts by weight (dry weight basis) of the polymer emulsion of Preparation Example 401 (Binder A, 40 wt % solid content) having an average particle diameter of about 120 nm, and then stirred for about 10 minutes to prepare a binder composition dispersion for a secondary battery.

Example 402

A binder composition dispersion for a secondary battery was prepared in substantially the same manner as in Example 401, except that about 2 parts by weight (dry weight basis) of a carbodiimide coupling agent (Carbodilite V-02-L2, available from Nisshinbo Chemical Inc., Tokyo, Japan) was added.

Example 403

A binder composition dispersion for a secondary battery was prepared in substantially the same manner as in Example 401, except that about 4 parts by weight (dry weight basis) of a carbodiimide coupling agent (Carbodilite V-02-L2, available from Nisshinbo Chemical Inc., Tokyo, Japan) was added.

Example 404

About 20 parts by weight (dry weight basis) of the polymer emulsion of Preparation Example 403 (15 wt % solid content) having an average particle diameter of about 70 nm and about 1 part by weight of γ-glycidoxypropyltrimethoxysilane as a silane coupling agent were added to about 100 parts by weight (dry weight basis) of the polymer emulsion of Preparation Example 402 (Binder B, 40 wt % solid content) having an average particle diameter of about 120 nm, and then stirred for about 10 minutes to prepare a binder composition dispersion for a secondary battery.

Example 405

A binder composition dispersion for a secondary battery was prepared, following the same procedures as described in Example 404, except that about 2 parts by weight of γ-glycidoxypropyltrimethoxysilane as a silane coupling agent was added.

Example 406

A binder composition dispersion for a secondary battery was prepared, following the same procedures as described in Example 404, except that about 4 parts by weight of γ-glycidoxypropyltrimethoxysilane as a silane coupling agent was added.

Example 407

$MgF_2$

A binder composition dispersion for a secondary battery was prepared following the same procedures as described in Example 401, except that about 40 parts by weight of magnesium fluoride ($MgF_2$, CIK NanoTek, Japan) having an average particle diameter of about 50 nm, instead of about 30 parts by weights of the polymer emulsion of Preparation Example 403 (15 wt % solid content) having an average particle diameter of about 70 nm, was added.

Example 408

Cross-Linked PMMA

A binder composition dispersion for a secondary battery was prepared following the same procedures as described in Example 401, except that about 25 parts by weight (dry weight basis) of a cross-linked polymethylmethacrylate (PMMA) emulsion (EPOSTAR 2B20, available from Nippon Shokubai, Tokyo, Japan) having an average particle diameter of about 50 nm, instead of about 30 parts by weights of the polymer emulsion of Preparation Example 403 (15 wt % solid content) having an average particle diameter of about 70 nm, was added.

Example 409

PU

A binder composition dispersion for a secondary battery was prepared following the same procedures as described in Example 201, except that about 30 parts by weight (dry weight basis) of a polyurethane (PU) emulsion (35 wt % solid content) having an average particle diameter of about 30 nm, instead of magnesium fluoride, was added.

The PU emulsion having a 35 wt % solid content was prepared by adding 150 parts by weight of ion-exchange water to about 100 parts by weight of a commercially purchased PU emulsion (SUPERFLEX 130, available from Dai-ichi Kogyo Seiyaku Co., Ltd., Tokyo, Japan, Tg; 101° C.) and removing the solvent by evaporation under a reduced pressure using a rotary evaporator until the solid content reached about 35 wt %.

Comparative Example 401

The emulsion of Comparative Preparation Example 401 was used as a binder composition dispersion for a secondary battery.

Comparative Example 402

The emulsion of Comparative Preparation Example 402 was used as a binder composition dispersion for a secondary battery.

Comparative Example 403

Binder Composition Dispersion not Including Particles Having a Tg of about 60° C. or Greater The emulsion (Binder A, 40 wt % solid content) of Preparation Example 401, including polymer particles having an average particle diameter of about 120 nm, was used as a binder composition dispersion for a secondary battery.

Manufacture of Anode and Lithium Battery

Example 410

A Si—Fe alloy active material (CV3, available from 3M, Minnesota, USA) having an average particle diameter (d50) of about 3 μm, artificial graphite (MAG, available from Hitachi Chemical Co., Ltd., Tokyo, Japan), and carboxymethylcellulose (CMC) were mixed in pure water, and then the binder composition dispersion of Example 401 for a secondary battery was added thereto to prepare an active material slurry with a weight ratio of Si—Fe alloy:graphite:CMC:binder (solid content) of about 20:77:1:2.

The active material slurry was coated on a 10 μm-thick copper (Cu) foil to a thickness of about 90 μm, dried at about 110° C. for about 30 minutes, and then roll-pressed to a thickness of about 70 μm to form an anode plate, which was then used to form a coin cell (CR2016) having a diameter of about 32 mm.

In manufacturing the coin cell, metal lithium as a counter electrode, a polyethylene separator (Star® 20) having a thickness of about 20 μm, and an electrolyte solution of 1.15M $LiPF_6$ dissolved in a mixed solvent of ethylenecarbonate (EC), ethylmethylcarbonate (EMC), and diethylcarbonate (DEC) in a 3:3:4 volume ratio were used.

Examples 411 to 418

Anodes and lithium batteries were manufactured following the same procedures as described as in Example 407, except that the binder compositions dispersions of Examples 402 to 409 were used, respectively.

Comparative Examples 404 to 406

Anodes and lithium batteries were manufactured following the same procedures as described in Example 407, except that the binder composition dispersions of Comparative Examples 401 to 403 were used, respectively.

Evaluation Example 401

High-Temperature Elastic Modulus Measurement

The binder composition dispersions of Examples 401 to 409 and Comparative Examples 401 and 403 were each coated on a substrate, and then dried at room temperature for about 24 hours to remove the solvent and form a film, which was then removed from the substrate for use as a binder composition sample. The binder composition samples were each cut to a size of 0.8 cm (width)×3 cm (length)×6 mm (thickness), and then loaded into a Tensile Tester (available from Instron) to measure change in strain with respect to stress, according to the ASTM Standard. An elastic modulus (E) at about 60° C. was calculated from the slope of a stress-strain curve of the binder composition sample. In Table 401, MPa denotes mega pascal.

In FIGS. 2, A, B, and C denote the length, width, and thickness of the binder composition sample, respectively.

TABLE 401

| Example | Elastic modulus [MPa] |
|---|---|
| Example 401 | 62 |
| Example 402 | 81 |
| Example 403 | 93 |
| Example 404 | 54 |
| Example 405 | 68 |
| Example 406 | 81 |
| Example 407 | 88 |
| Example 408 | 78 |
| Example 409 | 110 |
| Comparative Example 401 | 28 |
| Comparative Example 402 | — |
| Comparative Example 403 | 10 |

Referring to Table 401, the binder of Examples 401 to 409 for secondary batteries were found to have surprisingly improved elastic moduli, compared to the binder of Comparative Examples 401 and 403. It was impossible to form a binder film from the binder composition dispersion of Comparative Example 402 and measure the physical characteristics thereof.

Evaluation Example 402

Measurement of Breaking Strength of Electrolyte-Impregnated Binder Film

The binder composition dispersions of Examples 401 to 409 and Comparative Examples 401 to 403 for secondary batteries were each put into a Teflon petri dish having a diameter of about 12 cm and then dried at room temperature for about 2 days to prepare a binder film having a thickness of about 0.6 mm. The binder film was dried further in a 70° C.-vacuum drier for about 10 hours to completely remove moisture, and then cut into a binder sample having a length of about 5 cm and a width of about 5 mm for breaking strength measurement.

In FIGS. 2, A, B, and C denote the length, width, and thickness of the binder sample, respectively.

The binder composition sample was dipped in a mixed solvent for electrolyte of ethylene carbonate (EC), ethylmethyl carbonate (EMC) and diethyl carbonate (DEC) in a volume ratio of about 3:5:2 at about 70° C. for about 72 hours. After wiping the mixed solvent for electrolyte from the binder sample, a breaking strength of the binder sample was measured using a Tensile Tester at a tension speed of about 100 cm/min.

Breaking strengths of four electrolyte-impregnated binder samples for each of Examples 401 to 409 and Comparative Examples 401 and 403 were measured to calculate a breaking strength according to Equation 401 below.

Breaking Strength of binder composition sample = ⟨Equation 401⟩

Most strong breaking strength of binder composition samples × 0.5 +

Second most strong breaking strength of binder composition samples × 0.3 +

-continued $$\text{Third most breaking strength of binder composition samples} \times 0.1 + \text{Weakest breaking strength of binder composition samples} \times 0.1$$

The results are shown in Table 402 below.

TABLE 402

| Example | Breaking strength [kg/cm$^2$] |
| --- | --- |
| Example 401 | 40 |
| Example 402 | 68 |
| Example 403 | 82 |
| Example 404 | 35 |
| Example 405 | 52 |
| Example 406 | 55 |
| Example 407 | 69 |
| Example 408 | 77 |
| Example 409 | 90 |
| Comparative Example 401 | 7 |
| Comparative Example 402 | — |
| Comparative Example 403 | 23 |

Referring to Table 402, the binder compositions (binder films) obtained from the binder composition dispersions of Examples 401 to 409 for secondary batteries were found to have surprisingly highly improved breaking strengths of about 30 kg/cm$^2$ or greater when combined with electrolyte, compared to those of the binder compositions (binder films) obtained from the binder composition dispersions of Comparative Examples 401 to 403.

It was impossible to form a binder film from the binder composition dispersion of Comparative Example 402 and the physical characteristics thereof were not measured.

Evaluation Example 403

Evaluation of Charge-Discharge Characteristics and Electrode Expansion Ratio

The coin cells manufactured in Examples 410 to 418 and Comparative Examples 404 to 406 were each charged with a constant current of 0.05 C rate at 25° C. to a voltage of about 0.01V (with respect to Li), and then with a constant voltage of about 0.01V to a current of about 0.02 C, followed by discharging with a constant current of 0.05 C to a voltage of about 1.5V (with respect to Li) (Formation Process)

Subsequently, each of the cells after the formation process was charged with a constant current of 0.2 C rate at about 25° C. to a voltage of about 0.01V (with respect to Lithium) and then with a constant voltage of about 0.01V to a current of 0.02 C, followed by discharging with a constant current of 0.2 C to a voltage of 1.5 V (with respect to Lithium) to evaluate an initial charge-discharge efficiency and performance of the cell.

After the evaluation of the initial capacity, each of cells was charged with a constant current of 0.7 C rate at about 25° C. to a voltage of about 0.01V (with respect to Lithium) and then with a constant voltage of about 0.01V to a current of about 0.02 C, followed by discharging with a constant current of about 0.5 C to a voltage of about 1.5V (with respect to Lithium). This charge/discharge cycle was repeated 100 times.

Some of the results of the charge/discharge test are shown in Table 2 below. An electrode expansion ratio is defined by Equation 402 below.

After completion of the constant current/constant voltage charging at the 1st cycle, the cells were disassembled to measure thicknesses of an anode of the cell. The thickness of the anode before use (bare electrode), i.e., before the 1st cycle was also measured. The electrode expansion ratio of each cell was calculated using Equation 402.

The capacity retention rate is defined by Equation 403 below.

$$\text{Electrode expansion ratio [\%]} = \left[ \frac{\left( \begin{array}{c} \text{Thickness of anode after charging at } 1^{st} \\ \text{cycle} - \text{Thickness of unused electrode} \end{array} \right)}{\text{Thickness of unused anode(bare electrode)}} \right] \times 100 \quad \text{(Equation 402)}$$

$$\text{Capacity retention rate [\%]} = [\text{Discharge capacity at } 100^{th} \text{ cycle} / \text{Discharge capacity at } 1^{st} \text{ cycle}] \times 100 \quad \text{(Equation 403)}$$

TABLE 403

| Example | Cycle lifetime [%] | Electrode expansion ratio [%] |
| --- | --- | --- |
| Example 410 | 78 | 43 |
| Example 411 | 81 | 40 |
| Example 412 | 83 | 35 |
| Example 413 | 75 | 45 |
| Example 414 | 78 | 42 |
| Example 415 | 80 | 39 |
| Example 416 | 76 | 37 |
| Example 417 | 80 | 38 |
| Example 418 | 82 | 36 |
| Comparative Example 404 | 65 | 50 |
| Comparative Example 405 | — | — |
| Comparative Example 406 | 55 | 68 |

Referring to Table 403, the lithium batteries (coin cells) of Examples 410 to 418 were found to have decreased electrode expansion ratios and improved, good lifetime characteristics, compared to those of the lithium batteries of Comparative Examples 404 to 406.

In Comparative Example 405, it was impossible to manufacture an anode or a lithium battery from the binder composition dispersion of Comparative Example 402, and accordingly measure the physical characteristics thereof were not measured.

The lithium batteries of Examples 410 to 418 including the binder compositions having novel structures with increased strengths or good elastic modulli showed improved good lifetime characteristics due to the reduced electrode expansion ratios.

As described above, In some embodiments, a binder composition for a secondary battery that may include a first nanoparticle having a glass transition temperature of about 60° C. or greater and an average particle diameter of about 100 nm or less, and a first polymer binder having a glass transition temperature of about 20° C. or less may improve cycle characteristics of a lithium battery.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An anode, comprising:
   an anode active material; and
   a binder composition for a secondary battery, the binder composition comprising:
   a plurality of first nanoparticles having a glass transition temperature of about 60° C. or greater and an average particle diameter of about 100 nm or less; and
   a first polymer binder having a glass transition temperature of about 20° C. or less,
   wherein the binder composition comprises a first polymer binder aggregate of at least two first polymer binders, and the first nanoparticles are disposed in an interface between the at least two first polymer binders.

2. The anode of claim 1, wherein the amount of the first nanoparticles is in the range of about 1 part to about 60 parts by weight based on 100 parts by weight of the first polymer binder.

3. The anode of claim 1, wherein the first nanoparticles are dispersed in the first polymer binder.

4. The anode of claim 1, wherein the first nanoparticles are randomly dispersed in the first polymer binder.

5. The anode of claim 1, wherein the first nanoparticles are randomly disposed in the interface between the at least two first polymer binders.

6. The anode of claim 1, wherein the first nanoparticles comprises at least one selected from the group consisting of polyethylene, polypropylene, an ethylene-propylene copolymer, polyvinylchloride, polyvinylidenechloride, polystyrene, polyacrylonitrile, polytetrafluoroethylene, polymethylmethacrylate, polyvinylacetate, polyisoprene, polychloroprene, polyester, polycarbonate, polyamide, polyacrylate, polyurethane, an acrylonitrile-butadiene-styrene copolymer, polyoxyethylene, polyoxymethylene, polyoxypropylene, a styrene-acrylonitrile copolymer, an acrylonitrile-styrene-acrylate copolymer, a styrene-butadiene copolymer, an acrylated styrene-butadiene copolymer, an acrylonitrile-butadiene copolymer, an acrylonitrile-butadiene-styrene copolymer, acryl rubber, butyl rubber, fluorine rubber, polyvinylpyrolidone, polyepichlorohydrin, polyphosphazene, an ethylene propylene diene copolymer, polyvinylpyridine, chlorosulfonated polyethylene, polysulfone, polyvinylalcohol, thermoplastic polyester rubber (PTEE), carboxymethyl cellulose, hydroxypropylmethyl cellulose, hydroxypropyl cellulose, diacetyl cellulose, and any combinations thereof.

7. The anode of claim 1, wherein the first polymer binder comprises at least one selected from the group consisting of styrene-butadiene rubber, acrylated styrene-butadiene rubber, acrylonitrile-butadiene rubber, acrylonitrile-butadiene-styrene rubber, acryl rubber, butyl rubber, fluorine rubber, polytetrafluoroethylene, polyethylene, polypropylene, an ethylene-propylene copolymer, polyethylene oxide, polyvinylpyrolidone, polyepichlorohydrin, polyphosphazene, polyacrylate, polyacrylonitrile, polystyrene, ethylene propylene diene copolymer, polyvinylpyridine, chlorosulfonated polyethylene, latex, polyester resin, acryl resin, phenolic resin, epoxy resin, polyvinylalcohol, carboxymethyl cellulose, hydroxypropylmethyl cellulose, hydroxypropyl cellulose, diacetyl cellulose, and any combinations thereof.

8. The anode of claim 1, wherein the first polymer binder comprises a polar functional group able to chemically bind to the first nanoparticles.

9. The anode of claim 1, wherein the first nanoparticles are polymer particles.

10. The anode of claim 9, wherein the polymer particles are polyurethane.

11. The anode of claim 1, wherein the first nanoparticles are polymer particles or inorganic particles.

12. The anode of claim 11, wherein the polymer particles are cross-linked polymer particles.

13. The anode of claim 12, wherein the cross-linked polymer particles are cross-linked polymethylmethacrylate.

14. The anode of claim 11, wherein the inorganic particles comprise at least one selected from colloidal silica, α-alumina, γ-alumina, zirconium oxide, magnesium fluoride, and any combinations thereof.

15. The anode of claim 8, wherein the polar functional group is at least one selected from a carboxyl group, a hydroxy group, an amine group, and a glycidyl group.

16. The anode of claim 15, wherein the first nanoparticles comprise a polar functional group able to chemically bind to the first polymer binder.

17. The anode of claim 1, wherein the first polymer binder has a gel content of about 90% or less.

18. The anode of claim 1, wherein the binder composition further comprises a coupling agent for chemically binding the first nanoparticles and the first polymer binder.

19. The anode of claim 1, wherein the binder composition further comprises a solvent.

20. The anode of claim 1, wherein the first nanoparticles are inert with respect to at least one of a protonic acid and a Lewis acid.

21. The anode of claim 20, wherein the first nanoparticles are inorganic particles.

22. The anode of claim 20, wherein the first nanoparticles comprise at least one selected from a metal fluoride, a metal nitride, and a metal carbide.

23. The anode of claim 20, wherein the first nanoparticles comprise magnesium fluoride.

24. The anode of claim 20, wherein the first nanoparticles are not colored when dipped in an organic electrolyte solution including a lithium salt at about 70° C. for about 72 hours.

25. The anode of claim 18, wherein the coupling agent does not comprise a metalloid element.

26. The anode of claim 1, wherein the first polymer binder has a breaking strength of about 25 Kg/cm$^2$ or greater, as measured in a binder film impregnated with an electrolyte.

27. The anode of claim 1, wherein the first polymer binder has a breaking strength of about 30 Kg/cm$^2$ or greater, as measured in a binder film impregnated with an electrolyte.

28. The anode of claim 1, wherein the binder composition comprises:
   a filler comprising the first nanoparticles; and
   a matrix comprising the first polymer binder,
   wherein the filler is dispersed in an elastic matrix of the first polymer binder.

29. The anode of claim 1, wherein the first nanoparticles are chemically bound with the first polymer binder.

30. The anode of claim 1, wherein the anode active material comprises at least one selected from the group consisting of Si, Sn, Pb, Ge, Al, $SiO_x$, wherein x is more than 0 and equal to or less than 2 ($0<x\leq2$), $SnO_y$, wherein x is more than 0 and equal to or less than 2 ($0<y\leq2$), $Li_4Ti_5O_{12}$, $TiO_2$, $LiTiO_3$, and $Li_2Ti_3O_7$.

31. A lithium battery comprising the anode of claim 1.

* * * * *